United States Patent
Yoon et al.

(10) Patent No.: US 11,445,039 B2
(45) Date of Patent: Sep. 13, 2022

(54) METHOD AND APPARATUS FOR PROVIDING EDGE COMPUTING SERVICES

(71) Applicant: Samsung Electronics Co., Ltd., Suwon-si (KR)

(72) Inventors: Changbae Yoon, Suwon-si (KR); Heejung Kim, Suwon-si (KR); Chihyun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/162,726

(22) Filed: Jan. 29, 2021

(65) Prior Publication Data
US 2021/0243264 A1    Aug. 5, 2021

(30) Foreign Application Priority Data
Feb. 3, 2020    (KR) ........................ 10-2020-0012621

(51) Int. Cl.
*H04L 67/51* (2022.01)
*H04L 41/0813* (2022.01)
(Continued)

(52) U.S. Cl.
CPC .......... *H04L 67/51* (2022.05); *H04L 41/0813* (2013.01); *H04L 41/0823* (2013.01); *H04L 67/535* (2022.05)

(58) Field of Classification Search
CPC ..... H04L 67/16; H04L 67/22; H04L 41/0823; H04L 41/0813; H04L 41/5058;
(Continued)

(56) References Cited

U.S. PATENT DOCUMENTS 5,958,997 A  *  9/1999  Eunkyoung .............. C09D 4/00
                                                        522/182
7,120,442 B2    10/2006  Kim et al.
(Continued)

FOREIGN PATENT DOCUMENTS

EP         2237616 A1 * 10/2010  ............ H04W 40/36
KR       10-0755828         9/2007
(Continued)

OTHER PUBLICATIONS

3rd Generation Partnership Project; Technical Specification Group Services and System Aspects; Study on application architecture for enabling Edge Applications; (Release 17), 3GPP TR 23.758 V17.0.0, Dec. 19, 2019, (Year: 2019).*
(Continued)

*Primary Examiner* — Lance Leonard Barry
(74) *Attorney, Agent, or Firm* — Nixon & Vanderhye, P.C.

(57) ABSTRACT

An example method, performed by an edge data network configuration server, of relocating at least one service, currently provided from a source edge data network to at least one terminal, to a plurality of edge data networks having a hierarchical structure includes obtaining a service relocation request from the at least one terminal, determining relocation candidate services by reflecting the service relocation request, determining priorities of the relocation candidate services, obtaining location information of the at least one terminal, determining a relocation target service and a target edge data network based on at least one of the priorities or the location information, and requesting the target edge data network to provide the relocation target service to the at least one terminal, wherein the source edge data network and the target edge data network are hierarchically included in different tiers.

15 Claims, 13 Drawing Sheets

(51) Int. Cl.
*H04L 41/0823* (2022.01)
*H04L 67/50* (2022.01)

(58) Field of Classification Search
CPC ............ H04L 41/0806; H04L 41/5051; H04L 41/5022; H04L 41/044; H04L 67/34
See application file for complete search history.

(56) References Cited

U.S. PATENT DOCUMENTS

| | | | |
|---|---|---|---|
| 10,776,172 B1* | 9/2020 | Rachamadugu | .... H04L 41/0826 |
| 2013/0013774 A1* | 1/2013 | Ebrahim | ............. G06F 11/3433 |
| | | | 709/224 |
| 2014/0335906 A1* | 11/2014 | Kim | ........................ H04W 4/80 |
| | | | 455/509 |
| 2015/0249750 A1* | 9/2015 | Kakadia | ............. H04M 15/8011 |
| | | | 455/406 |
| 2018/0351824 A1 | 12/2018 | Giust et al. | |
| 2019/0026751 A1* | 1/2019 | Deas | .................. H04N 7/17318 |
| 2019/0053108 A1 | 2/2019 | Trang et al. | |
| 2019/0104030 A1 | 4/2019 | Giust et al. | |
| 2019/0158300 A1 | 5/2019 | Sabella et al. | |
| 2019/0243438 A1 | 8/2019 | Park et al. | |
| 2019/0246252 A1* | 8/2019 | Rasmusson | ............. H04W 4/38 |

FOREIGN PATENT DOCUMENTS

| | | | |
|---|---|---|---|
| KR | 10-2019-0096021 | 8/2019 | |
| WO | WO-9736451 A1 * | 10/1997 | .............. H04W 8/10 |
| WO | 2018-153357 | 8/2018 | |
| WO | 2019-191784 | 10/2019 | |

OTHER PUBLICATIONS

Search Report and Written Opinion dated May 3, 2021 in counterpart International Patent Application No. PCT/KR2021/001208.
"3rd Generation Partnership Project; Technical Specification Group Services and System Aspects; Study on application architecture for enabling Edge Applications; (Release 17)", 3GPP TR 23.758 V17.0.0, Dec. 19, 2019, 115 pages.

* cited by examiner

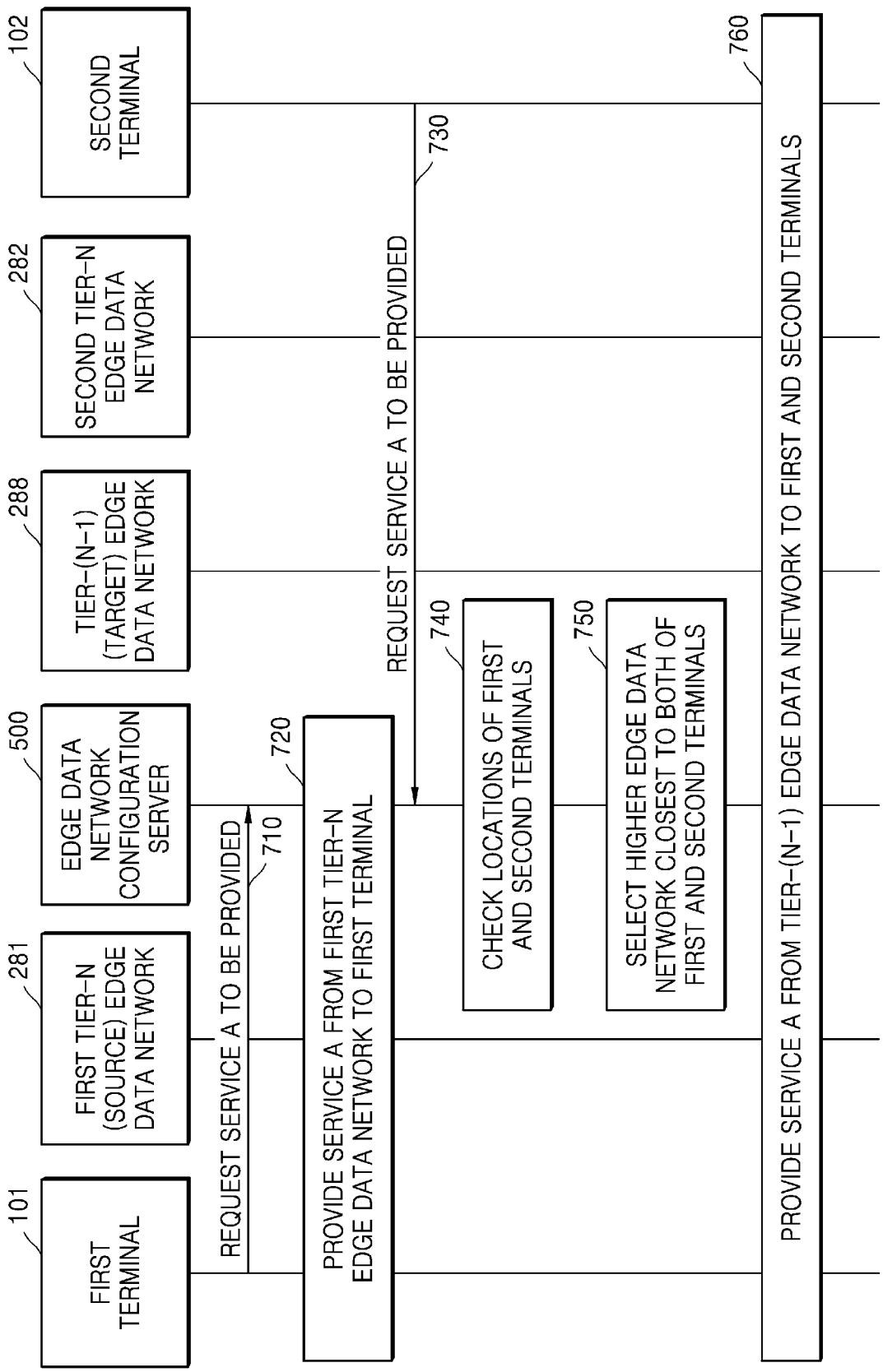

METHOD AND APPARATUS FOR PROVIDING EDGE COMPUTING SERVICES

CROSS-REFERENCE TO RELATED APPLICATION

This application is based on and claims priority under 35 U.S.C. § 119 to Korean Patent Application No. 10-2020-0012621, filed on Feb. 3, 2020, in the Korean Intellectual Property Office, the disclosure of which is incorporated by reference herein in its entirety.

BACKGROUND

1. Field

The disclosure relates to a method and apparatus for edge computing services (e.g., multi-access edge computing (MEC) services).

2. Description of Related Art

Currently, edge computing technology for transmitting data using an edge server is being discussed. Edge computing technology may include, for example, multi-access edge computing (MEC) or fog computing (FC). Edge computing technology may refer to a technology for providing data to an electronic device through a server installed at a location geographically close to the electronic device, e.g., in or near a base station (hereinafter referred to as an 'edge data network', an 'MEC server', or a 'mobile edge host'). For example, an application requiring a low latency from among one or more applications installed in the electronic device may transmit or receive data through an edge server installed at a geographically close location without passing through a server located in an external data network (DN) (e.g., Internet).

Currently, services using the edge computing technology (hereinafter referred to as 'MEC-based services' or 'edge computing services') are being discussed and electronic devices supporting edge computing services are being studied and developed. For example, an application of an electronic device may transmit or receive edge-computing-based data to or from an edge server (or an application of the edge server) on an application layer.

Due to the progress of research and development for supporting edge computing services, a method for allowing an edge data network (e.g., an MEC server) to provide edge computing services to satisfy latency requirements of services and efficiently operate resources of a MEC system is being discussed. For example, a method of relocating edge computing services between edge data networks of different tiers to provide an edge computing service to a terminal in a hierarchical edge data network structure is being studied.

SUMMARY

Embodiments of the disclosure provide a method and apparatus for providing an edge computing service to a terminal by efficiently using resources of edge data networks in an edge data network system.

Additional aspects will be set forth in part in the description which follows and, in part, will be apparent from the description.

According to an example embodiment, a method, performed by an edge data network configuration server, of relocating at least one service currently provided from a source edge data network to at least one terminal, to a plurality of edge data networks having a hierarchical structure includes: determining whether to relocate services of the source edge data network, determining relocation candidate services based on a result of determining whether to relocate services, determining priorities of the relocation candidate services, obtaining location information of the at least one terminal, determining a relocation target service and a target edge data network based on at least one of the priorities or the location information, and requesting the target edge data network to provide the relocation target service to the at least one terminal, wherein the source edge data network and the target edge data network are included in different tiers of the hierarchical structure.

The determining of the relocation target service and the target edge data network may include determining the relocation target service as a service having a highest priority, based on a result of determining the priorities, determining a number of terminals currently receiving the relocation target service from the source edge data network in a service area of a lower-tier edge data network of the source edge data network, comparing the determined number of terminals to a threshold, and determining the lower-tier edge data network as the target edge data network when a result of the comparing indicates that the determined number of terminals is greater than the threshold, and the threshold may correspond to a largest number of terminals to which the lower-tier edge data network is capable of providing the relocation target service.

The determining of the relocation target service and the target edge data network may include determining the relocation target service as a service having a lowest priority, based on a result of determining the priorities, determining a number of terminals to which the source edge data network provides the relocation target service, comparing the determined number of terminals to a threshold, and determining a higher-tier edge data network of the source edge data network as the target edge data network when a result of the comparing indicates that the determined number of terminals is less than the threshold, and the threshold may correspond to a largest number of terminals to which the source edge data network is capable of providing the relocation target service.

The target edge data network may be included in a higher-tier of the source edge data network when the relocation target service has a highest priority from among the relocation candidate services, or be included in a lower-tier of the source edge data network when the relocation target service has a lowest priority from among the relocation candidate services.

The determining of the relocation candidate services may include identifying services currently provided from the source edge data network, and the relocation candidate services may include a combination of services to be newly provided and the identified services, except for services to be terminated from among the identified services.

The priorities may be determined based on resource requirements and latency requirements of the relocation candidate services.

The obtaining of the location information of the at least one terminal may include receiving the location information of the at least one terminal from at least one of the at least one terminal or a $3^{rd}$ Generation Partnership Project (3GPP) network entity connected to the at least one terminal.

According to an example embodiment, an edge data network configuration configured to relocate at least one service, currently provided from a source edge data network to at least one terminal, to a plurality of edge data networks having a hierarchical structure includes: a communication module comprising communication circuitry, a memory storing a plurality of instructions, and at least one processor configured to execute the plurality of instructions to: determine whether to relocate services of the source edge data network, determine relocation candidate services based on a result of determining whether to relocate services, determine priorities of the relocation candidate services, obtain location information of the at least one terminal, determine a relocation target service and a target edge data network based on at least one of the priorities or the location information, and request the target edge data network to provide the relocation target service to the at least one terminal, wherein the source edge data network and the target edge data network are included in different tiers of the hierarchical structure.

The at least one processor may be further configured to execute the plurality of instructions to determine the relocation target service as a service having a highest priority, based on a result of determining the priorities, determine a number of terminals currently receiving the relocation target service from the source edge data network in a service area of a lower-tier edge data network of the source edge data network, compare the determined number of terminals to a threshold, and determine the lower-tier edge data network as the target edge data network when a result of the comparing indicates that the determined number of terminals is greater than the threshold, and the threshold may correspond to a largest number of terminals to which the lower-tier edge data network is capable of providing the relocation target service.

The at least one processor may be further configured to execute the plurality of instructions to determine the relocation target service as a service having a lowest priority, based on a result of determining the priorities, determine a number of terminals to which the source edge data network provides the relocation target service, compare the determined number of terminals to a threshold, and determine a higher-tier edge data network of the source edge data network as the target edge data network when a result of the comparing indicates that the determined number of terminals is less than the threshold, and the threshold may correspond to a largest number of terminals to which the source edge data network is capable of providing the relocation target service.

The target edge data network may be included in a higher-tier of the source edge data network when the relocation target service has a highest priority from among the relocation candidate services, or be included in a lower-tier of the source edge data network when the relocation target service has a lowest priority from among the relocation candidate services.

The at least one processor may be further configured to execute the plurality of instructions to identify services currently provided from the source edge data network, and the relocation candidate services may include a combination of services to be newly provided and the identified services, except for services to be terminated from among the identified services.

The priorities may be determined based on resource requirements and latency requirements of the relocation candidate services.

The at least one processor may be further configured to execute the plurality of instructions to receive the location information of the at least one terminal from at least one of the at least one terminal or a $3^{rd}$ Generation Partnership Project (3GPP) network entity connected to the at least one terminal.

According to an embodiment of the disclosure, a non-transitory computer-readable recording medium has recorded thereon a computer program for executing the above-described method.

According to an embodiment of the disclosure, another method and another system may be used to implement the disclosure, and a non-transitory computer-readable recording medium has recorded thereon a computer program for executing the other method.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 7B is a flowchart illustrating an example method of relocating a service based on locations of terminals in a network system, according to various embodiments;

DETAILED DESCRIPTION

Figure 1A:
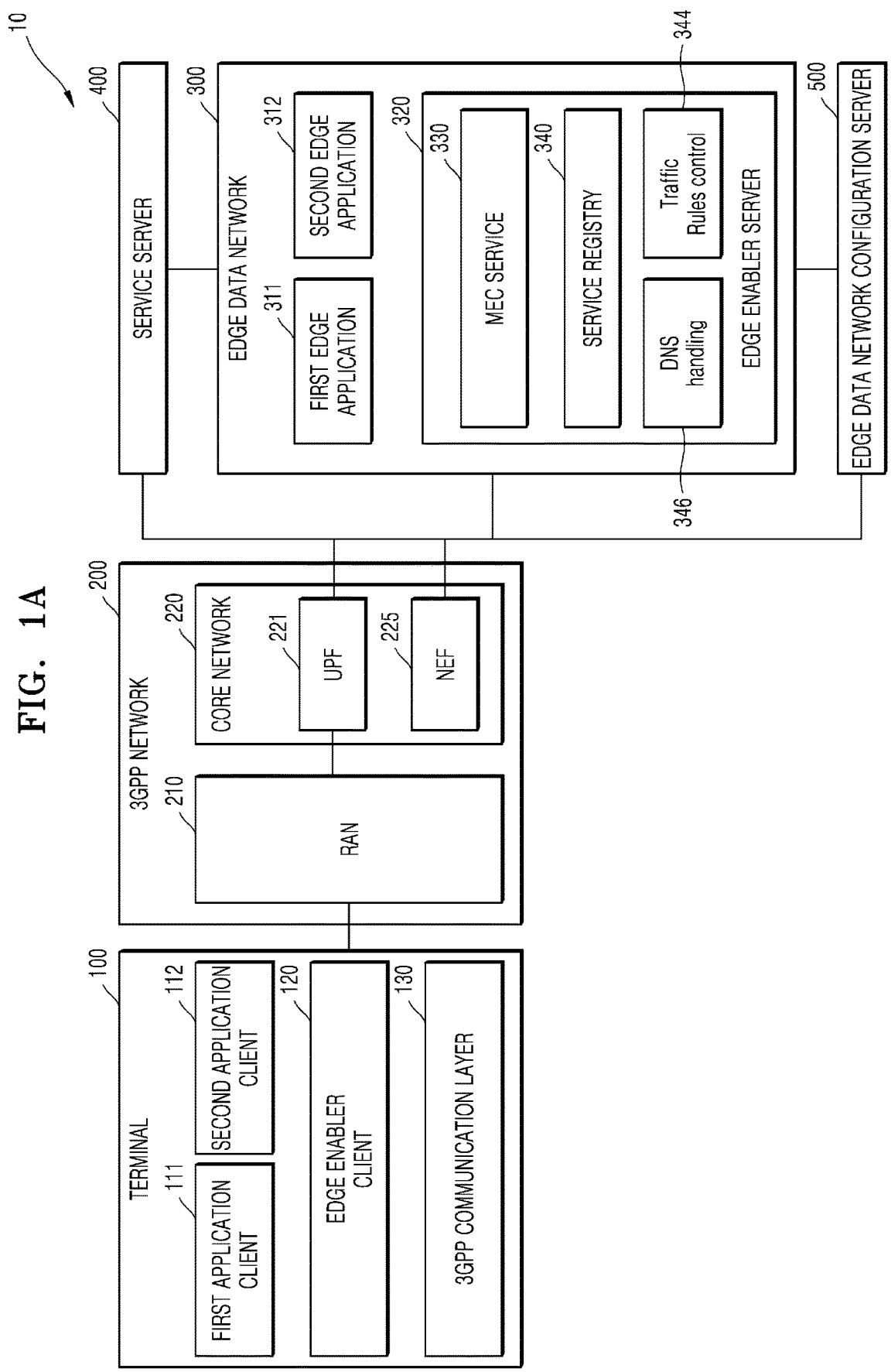
FIG. 1A is a diagram schematically illustrating an example network environment for supporting an edge computing service, according to various embodiments.

Hereinafter, the disclosure will be described in greater detail with reference to the attached drawings.

While describing the various example embodiments of the disclosure, technical content that is well-known in the art and not directly related to the disclosure may not be described.

Some elements are exaggerated, omitted, or schematically illustrated in drawings. The size of each element may not completely reflect a real size thereof. In the drawings, like or corresponding elements are denoted by like reference numerals.

One or more embodiments of the disclosure and methods of accomplishing the same may be understood more readily by reference to the following detailed description and the accompanying drawings. The disclosure may, however, be embodied in many different forms and should not be construed as being limited to the example embodiments set forth herein; rather, these example embodiments are provided to convey the concept of the disclosure to one of ordinary skill in the art. Throughout the disclosure, like reference numerals denote like elements.

It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may produce manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" may denote, for example, a software element or a hardware element such as a field-programmable gate array (FPGA) or an application-specific integrated circuit (ASIC), and perform a certain function. However, the term "unit" is not limited to software or hardware. The "unit" may be configured to be in an addressable storage medium, or be configured to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into a smaller number of elements and "units", or may be divided into additional elements and "units". Furthermore, the elements and "units" may be embodied to reproduce one or more central processing units (CPUs) in a device or a secure multimedia card. Also, the "unit" may include one or more processors.

Throughout the disclosure, the expression "at least one of a, b or c" indicates only a, only b, only c, both a and b, both a and c, both b and c, all of a, b, and c, or variations thereof.

Examples of a terminal may include, but are not limited to, a user equipment (UE), a mobile station (MS), a cellular phone, a smartphone, a computer, a multimedia system capable of performing a communication function, or the like.

In the disclosure, a controller may also be referred to as a processor.

Throughout the disclosure, a layer (or a layer apparatus) may also be referred to as an entity.

FIG. 1A is a diagram illustrating an example network environment 10 for supporting an edge computing service, according to various embodiments.

Referring to FIG. 1A, the network environment 10 may include a terminal 100, a $3^{rd}$ Generation Partnership Project (3GPP) network 200, an edge data network 300, a service server 400, and an edge data network configuration server 500. However, the configuration of the network environment 10 is not limited to the configuration shown in FIG. 1A.

According to various embodiments, the elements included in the network environment 10 may refer to physical entity units, or software or module units capable of performing individual functions. Therefore, each element included in the network environment 10 may also be called an entity or a function.

According to various embodiments, the terminal 100 may refer to a device used by a user. For example, the terminal 100 may refer to a user equipment (UE), a remote terminal, a wireless terminal, or a user device. The terminal 100 may include all types of devices.

According to various embodiments, the terminal 100 may run (or execute) a plurality of application clients. For example, the terminal 100 may include a first application client 111 and a second application client 112. The plurality of application clients may require different network services based on at least one of a data transfer rate of the terminal 100, latency (delay time or rate), reliability, the number of terminals 100 accessing a network, a network access cycle of the terminal 100, or average data usage. The different network services may include, for example, enhanced mobile broadband (eMBB), ultra-reliable and low latency communication (URLLC), or massive machine type communication (mMTC).

An application client of the terminal 100 may refer to, for example, a default application pre-installed in the terminal 100, or an application provided by a third party. That is, the application client may refer to a client application program running in the terminal 100 for a specific application service. Various application clients may run in the terminal 100. At least one of the application clients may be used to provide an edge computing service from the edge data network 300 to the terminal 100. For example, the application client may be an application installed and executed in the terminal 100, and provide a function of transmitting or receiving data through the edge data network 300. The application client of the terminal 100 may refer to application software (or a module) executed in the terminal 100 to use functions provided by one or more specific edge applications.

According to various embodiments, the first and second application clients 111 and 112 of the terminal 100 may perform data transmission with the service server 400 or perform edge-computing-based data transmission with the edge data network 300, based on a required network service type. For example, when the first application client 111 does not require a low latency, the first application client 111 may perform data transmission with the service server 400. As another example, when the second application client 112 requires a low latency, the second application client 112 may perform multi-access edge computing (MEC)-based data transmission with the edge data network 300. However, the terminal 100 is not limited thereto and may determine whether to transmit or receive data to or from the service server 400 or the edge data network 300, based on various conditions other than the latency.

According to various embodiments, the application client of the terminal 100 may, for example, be called a UE application (or a UE App), an application client, or a client application (or a client App). In the following description, for convenience's sake, the application client of the terminal 100 is also called an application client.

According to various embodiments, the terminal 100 may include an edge enabler client 120 and a 3GPP communication layer 130. According to an example embodiment, the edge enabler client 120 may refer to a layer for performing an operation in the terminal 100 to allow the terminal 100 to use an edge computing service. According to an example embodiment, the edge enabler client 120 may also be called an MEC enabling layer (MEL). The edge enabler client 120 may determine which UE App may use the edge computing service, and provide a network interface in such a manner that data of the application client of the terminal 100 may be transmitted to the edge data network 300 for providing the edge computing service.

In addition, the edge enabler client 120 may perform, with the 3GPP communication layer 130, an operation for establishing a data connection for allowing the terminal 100 to use the edge computing service. The 3GPP communication layer 130 may refer to, for example, a layer for performing a modem operation for using a mobile communication system, and serve to establish a wireless connection for data communication, register the terminal 100 in the mobile communication system, establish a connection for data transmission to the mobile communication system, and transmit or receive data.

According to various embodiments, the 3GPP network 200 may be a wireless communication system complying with the 3GPP standards, and be connected to the terminal 100 to provide a wireless communication service to the terminal 100. The 3GPP network 200 may include, for example, a $3^{rd}$ generation (3G) network, a long term evolution (LTE) network, a long term evolution-advanced (LTE-A) network, or a $5^{th}$ generation (5G) or new radio (NR) network. However, the 3GPP network 200 of the disclosure is not limited thereto and may include a network using another communication technology.

According to various embodiments, the 3GPP network 200 may include a radio access network (RAN) 210 and a core network 220. According to an example embodiment, the RAN 210 of the 3GPP network 200 is, for example, a network connected directly to the terminal 100, and is, for example, an infrastructure for providing radio access to the terminal 100. The RAN 210 may include a plurality of base stations, and the plurality of base stations may communicate through interfaces formed therebetween. At least some of the interfaces between the plurality of base stations may be wired or wireless interfaces. A base station may also be called a gNode B, an eNode B, a Node B, a base station (BS), a radio access unit, a base station controller, a node on a network, or another term having a technically equivalent meaning.

According to various embodiments, the core network 220 of the 3GPP network 200 may process data and control signals transmitted or received by the terminal 100 through the RAN 210. The core network 220 may perform various functions such as control of a user plane and a control plane, handling of mobility, management of subscriber information, charging, and cooperation with another type of system (e.g., an LTE system). In order to perform the above-mentioned various functions, the core network 220 may include a plurality of functionally separate entities having different network functions (NFs).

For example, the core network 220 may include a user plane function (UPF) 221, an access and mobility management function (AMF) (not shown), a session management function (SMF) (not shown), a policy control function (PCF) (not shown), a network exposure function (NEF) 225, a user data management (UDM) function (not shown), a network data analytics function (NWDAF) (not shown), and a gateway mobile location center (GMLC) (not shown).

The UPF 221 may provide a data path (or a data plane) between the terminal 100 and the edge data network 300. That is, the UPF 221 may serve as a gateway for delivering data (or data packets) transmitted or received by the terminal 100.

The terminal 100 and the edge data network 300 may transmit or receive data (or data packets) therebetween through the UPF 221. A data network (DN) may be present between the edge data network 300 and the UPF 221. The UPF 221 may be located close to the edge data network 300 to support an edge computing service for the terminal 100, and deliver data packets of the terminal 100 to the edge data network 300 at a low latency or deliver data packets of the edge data network 300 to the terminal 100 at low latency.

The UPF 221 may provide a data path between the terminal 100 and the edge data network 300 using a data network connected through the internet. The UPF 221 may route data packets to be transmitted through the Internet from among the data packets transmitted from the terminal 100, to a data network between the service server 400 and the terminal 100.

The NEF 225 may be an NF for exposing capabilities and services of the NFs of the 3GPP network 200. The NEF 225 may be connected to an external server (e.g., the edge data network 300) to transmit information about an event occurring in an NF of the 3GPP network 200, to the external server, or transmit information about an event requested by the external server, to an NF of the 3GPP network 200. The capabilities and services exposed by the NEF 225 may include, for example, event reporting related to a location of the terminal 100, event reporting related to a session of the terminal 100, and event reporting for mobility management of the terminal 100. The external server may subscribe to a capability and service exposed by the NEF 225, and access the capability and service.

According to various embodiments, the edge data network 300 may refer to, for example, a server accessed by the terminal 100 to use an edge computing service. The edge data network 300 may be placed in or geographically close to a base station of the 3GPP network 200 connected to the terminal 100, and provide a service at least partially the same as the service provided by the service server 400. In an example embodiment, MEC may indicate multi-access edge computing or mobile-edge computing.

According to various embodiments, the edge data network 300 may be called an MEC server, an MEC host, an edge computing server, a mobile edge host, an edge computing platform, or the like.

According to various embodiments, the edge data network 300 may include and execute (or run) a plurality of edge applications. For example, the edge data network 300 may execute a first edge application 311 and a second edge application 312. According to an example embodiment, an edge application may refer to an application provided by a third party in the edge data network 300 for providing an edge computing service. The edge application may be used to establish a data session with an application client to transmit or receive data related to the application client. That is, the edge application may establish the data session with the application client. According to an example embodiment, the data session may refer to, for example, a communication path established to transmit or receive data between the application client of the terminal 100 and the edge application of the edge data network 300.

According to various embodiments, the edge data network 300 may provide virtual resources to the edge application. The virtual resources may include at least one of, for example, computing resources, storage resources, or network resources (e.g., a network bandwidth) usable by the edge application. The edge application of the edge data network 300 may be executed (or run) using a virtual machine.

According to various embodiments, an application of the edge data network 300 may be called an edge application (or an edge App), an MEC application (or an MEC App), an edge application server, or an ME (or MEC) App. In the following description, for convenience's sake, the application of the edge data network 300 is also called an edge application.

According to various embodiments, the edge data network 300 may include an edge enabler server 320. According to an example embodiment, the edge enabler server 320 may be called a mobile edge computing platform (MEC platform), a mobile edge platform (ME platform or MEP), a platform, or the like.

According to various embodiments, the edge enabler server 320 may provide a function required to execute the edge application. For example, the edge enabler server 320 may provide a function or environment for allowing the edge application to provide an edge computing service to the terminal 100 or the like, or allowing the edge application to consume an edge computing service. In addition, the edge enabler server 320 may perform traffic control using Traffic Rules control 344 or domain name system (DNS) handling using DNS handling 346.

According to various embodiments, the edge computing service may collectively refer to services related to a procedure and information required to use the edge application. The edge computing service may be provided or consumed by the edge enabler server 320 or the edge application. For example, the edge application may provide the edge computing service to the terminal 100, or consume the edge computing service provided by the edge enabler server 320, to provide the edge computing service to the terminal 100. In addition, the edge enabler server 320 may provide, to the edge application, the edge computing service consumable by the edge application to provide the edge computing service to the terminal 100. In the following description, the edge computing service may refer to a service provided from the edge data network 300 or the edge application to the terminal 100, or a service provided by the edge enabler server 320 and consumable by the edge application.

According to various embodiments, the edge enabler server 320 may provide the edge computing service to the edge application. For example, the edge enabler server 320 may provide various types of information (e.g., data or content such as location information of the terminal 100, caching data, or subscribed service information) to the edge application according to the edge computing service to be provided. The edge application may provide the edge computing service to the terminal 100 by consuming the edge computing service provided by the edge enabler server 320. For example, the edge application may provide the edge computing service to the terminal 100 based on the information provided from the edge enabler server 320 as the edge computing service. The edge computing service provided to the terminal 100 may be a service required for the terminal 100 to run the application client (e.g., providing data required to run the application client). In the following description, when the edge data network 300 provides the edge computing service to the terminal 100, the edge application of the edge data network 300 provides the edge computing service required for the terminal 100 to run the application client.

According to various embodiments, the edge enabler server 320 may include an MEC service 330 and a service registry 340. The MEC service 330 may provide the edge computing service to the edge applications included in the edge data network 300. The MEC service 330 may be implemented as software or a module capable of performing an individual function. The service registry 340 may provide information about edge computing services available in the edge data network 300.

According to various embodiments, when an edge application is instantiated, the edge enabler server 320 may register the edge application therein. The edge enabler server 320 may register the edge application, and store information related to the edge application. The information related to the edge application and stored in the edge enabler server 320 may include information about the edge computing service to be provided from the edge application to the terminal 100 or the like, and information about whether the edge computing service is a service required or optional to the edge application.

According to various embodiments, the edge application may register a new edge computing service in the edge enabler server 320, update a registered edge computing service, or search edge computing services registered in the edge enabler server 320. To register or update an edge computing service in the edge enabler server 320, the edge application may provide, to the edge enabler server 320, information about the edge computing service to be registered or updated. The edge enabler server 320 may register the edge computing service in the service registry 340.

According to various embodiments, the edge enabler server 320 may provide, to the edge application in the edge data network 300, information about edge computing services registered in the service registry 340. For example, the edge enabler server 320 may provide, to the edge application, a list of the edge computing services registered in the service registry 340. In addition, the edge enabler server 320 may provide, to the edge application, information about availability of edge computing services registered or newly registered in the service registry 340.

According to various embodiments, the edge application may subscribe to an edge computing service registered in the service registry 340. The edge application may subscribe to the edge computing service by transmitting edge computing service subscription request information to the service registry 340. When the edge application subscribes to the edge computing service, it may refer, for example, to the edge application continuously receiving the edge computing service or information about the edge computing service from the edge enabler server 320.

According to various embodiments, the service server 400 may provide content related to the application client of the terminal 100.

As described above, the first and second application clients 111 and 112 of the terminal 100 may perform data transmission with the service server 400 based on a required network service type. For example, when the first application client 111 does not require a low latency, the first application client 111 may perform data transmission with the service server 400. The terminal 100 is not limited thereto and may determine whether to transmit or receive data to or from the service server 400 or the edge data network 300, based on various conditions other than the latency.

The service server 400 may provide a service or data required for the terminal 100 to run (or execute) the application client, and provide, to the edge data network 300, an edge application capable of providing the edge computing service to the application client of the terminal 100. In addition, the service server 400 may provide, to the edge data network 300, the service or data required for the terminal 100 to run (or execute) the application client. The service server 400 may be operated or managed by a content provider for providing content to the terminal 100.

The edge data network configuration server 500 may provide support functions for connecting the terminal 100 to the edge enabler server 320.

According to various embodiments, the edge data network configuration server 500 may refer to a server that the terminal 100 initially accesses to receive edge data network configuration information required to use an edge computing service. The edge data network configuration server 500 may be aware of the deployment of edge data networks, and the terminal 100 may access the edge data network configuration server 500 to receive configuration information required to use an edge computing service, e.g., information about an edge data network to access at a specific location.

According to various embodiments, the edge data network configuration server 500 may perform a function of providing the edge data network configuration information to the edge enabler client 120. For example, the edge data network configuration information may include information required for the terminal 100 to be connected to the edge data network 300 using service area information (e.g., information about an edge data network for providing services in a certain area), and information for establishing a connection to the edge enabler server 320 (e.g., information for identifying the edge data network).

The edge data network configuration server 500 may be called an edge data network management server, an edge configuration server, a configuration server, or the like, and serve as a mobile edge platform manager (MEPM) or a multi-access edge orchestrator (MEO).

According to various embodiments, the edge data network configuration server 500 may refer to an MEC management proxy (MMP) server or a domain name system (DNS) server.

Figure 1B:
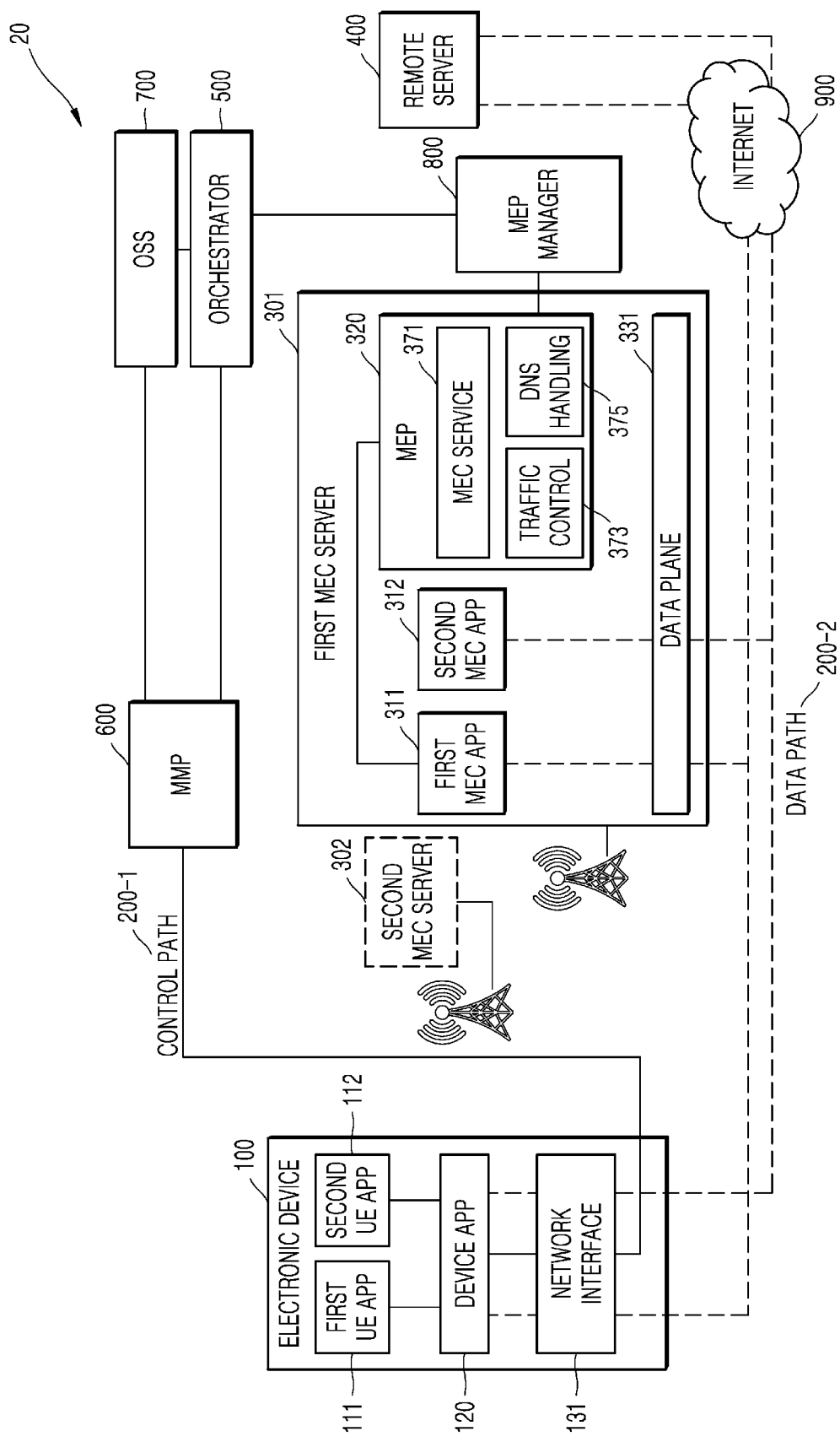
FIG. 1B is a diagram illustrating an example network environment for supporting an edge computing service, according to various embodiments.

FIG. 1B is a diagram illustrating an example network environment 20 for supporting an edge computing service, according to various embodiments.

Referring to FIG. 1B, according to various embodiments, elements included in the network environment 20 may refer to physical entity units, or software or module units capable of performing individual functions.

According to various embodiments, the network environment 20 may include an electronic device 100, an MEC system, Internet 900, and a remote server 400. In this case, the electronic device 100 of FIG. 1B may perform functions and operations the same as or similar to those of the example terminal 100 of FIG. 1A, and the MEC system of FIG. 1B may perform functions and operations the same or similar to those of the example edge data network 300 and the example edge data network configuration server 500 of FIG. 1A. In addition, Internet 900 of FIG. 1B may perform functions and operations the same or similar to those of the example UPF 221 of the example 3GPP network 200 of FIG. 1A, and the remote server 400 of FIG. 1B may perform functions and operations the same or similar to those of the example service server 400 of FIG. 1A.

According to various embodiments, the electronic device 100 may include a first client App (or first UE App) 111, a second client App (or second UE App) 112, an edge enabler client (or a device App) 120, and a network interface 131. The first client App 111 and the second client App 112 may refer, for example, to default applications pre-installed in the electronic device 100, or applications provided by a third party. The edge enabler client 120 may refer, for example, to a combination of an MEC service agent (MSA) and an MEC service enabler (MSE). The edge enabler client 120 may also refer to an MEC enabling layer (MEL). In an example embodiment, the network interface 131 may refer, for example, to a communication circuit used by the electronic device 100 to transmit or receive data.

According to various embodiments, the MEC system may include an MEC management proxy (MMP) 600, an operations support system (OSS) 700, an orchestrator 500, an MEC platform (MEP) manager 800, a first MEC edge host (or MEC server) 301, and a second MEC edge host (or MEC server) 302. Although not shown in FIG. 1B, the electronic device 100 may perform wireless communication through an access network placed between an MEC edge host (e.g., the first MEC edge host 301 or the second MEC edge host 302) and the MMP 600. In an example embodiment, the MMP 600 may be called a life cycle management proxy.

According to various embodiments, the first MEC edge host 301 may include a first MEC App 311, a second MEC App 312, an MEP 320, and a data plane 331. The second MEC edge host 302 may include the same elements as the first MEC edge host 301.

Referring to FIG. 1B, in the network environment 20, an MEC user plane may refer to a path (e.g., a data path 200-2) for transmitting user data packets between applications of the electronic device 100 (e.g., the first client App 111 and the second client App 112) and MEC applications installed in the first MEC edge host 301 (e.g., the first MEC App 311 and the second MEC App 312) in order for the electronic device 100 to provide an edge computing service to a user. According to an example embodiment, an MEC control plane may refer to a path (e.g., a control path 200-1) for transmitting control information of the MEC system for the user data packets transmitted or received on the user plane.

According to various embodiments, through the control path (e.g., the MEC control plane) between the device App 120 and the MMP 600, authentication, authorization, and discovery procedures may be performed.

According to various embodiments, after discovery, an edge computing service may be provided through the data path (e.g., the MEC user plane 200-2) between the UE applications of the electronic device 100 (e.g., the first client App 111 and the second client App 112) and the MEC applications of the first MEC edge host 301 (e.g., the first MEC App 311 and the second MEC App 312). A MEC data plane may refer to the above-described data plane 331 of FIG. 1B. According to an example embodiment, the MEC system may refer to a system placed in a network of a communications service provider and usable for MEC-based data transmission. The MEC system may include the MMP 600, the OSS 700, the orchestrator 500, the MEP manager 800, and an MEC edge host. According to an example embodiment, the MEC edge host may include a plurality of MEC edge hosts. For example, the MEC edge host may include the first MEC edge host 301 and the second MEC edge host 302.

According to various embodiments, the MMP 600 may be a server and may provide an edge computing service (e.g., a user application interface for the MEC system (see ETSI MEC 016 specification)) to a user equipment (UE) (e.g., the electronic device 100). For example, the electronic device 100 may request information about application(s) providable by the MEC system (e.g., an available application list) from the MMP 600, and transmit an execution request (e.g., context creation) and a termination request (e.g., context termination) of a specific application to the MEC system. As another example, the MMP 600 may manage life cycles of applications installed in the MEC system (e.g., the first MEC App 311, the second MEC App 312, . . . ). For example, the MMP 600 may receive the request of the electronic device 100, and transmit the received request to the MEC system (e.g., the OSS 700 and the orchestrator 500) to manage the life cycles of the applications installed in the MEC system (e.g., the first MEC App 311, the second MEC App 312, . . . ).

According to various embodiments, the OSS 700 may grant instantiation or termination of an application. An instance of the application may be a set of instructions for executing the application, and instantiation may refer to an operation in which a processor of a MEC edge host (e.g., the first MEC edge host 301 or the second MEC edge host 302) executes a MEC application using the instance.

According to various embodiments, the orchestrator 500 may manage and maintain overall functions of MEC-based data transmission based on at least one of available resources, available edge computing services, rules and requirements of the application, policies of an operator, or topology. For example, the orchestrator 500 may select an MEC edge host (e.g., the first MEC edge host 301 or the second MEC edge host 302 of FIG. 1B) appropriate for an application of the electronic device 100, or trigger instantiation of or terminate the application.

According to various embodiments, the orchestrator 500 may be called a mobile edge orchestrator (MEO), and include an MEC application orchestrator (MEAO) (not shown) and a network functions virtualization orchestrator (NFVO) (not shown).

According to various embodiments, the MEP manager 800 may manage at least one of rules, requirements, service grants, or traffic rules of the application.

According to various embodiments, the first MEC edge host 301 may include one or more MEC applications (e.g., the first MEC App 311 and the second MEC App 312) usable to establish sessions with one or more applications installed in the electronic device 100 (e.g., the first client App 111, the second client App 112, . . . ). According to an example embodiment, the first MEC edge host 301 may include the MEP 320. The MEP 320 may receive traffic rules from the MEP manager 800, and control the traffic rules on the MEC user plane.

According to various embodiments, an MEL server configured to exchange data with an MEC service module (or an MEC service layer) of the electronic device 100 may be included in the electronic device 100 or an edge data network (e.g., the first MEC edge host 301 or the second MEC edge host 302 of FIG. 1B). The device App 120 may refer to an MEL, and the MEL is included in the electronic device 100. However, the MEL server is not limited thereto and may also be included in the edge data network. For example, information in the MEL server and information related to client Apps installed in the electronic device 100 may be stored in one or more distributed edge data networks. However, a procedure for communicating with the one or more distributed edge data networks in which the above-mentioned information is stored may be added, and thus a time for executing a client App of the electronic device 100 may be increased.

According to various embodiments, the MEP 320 may provide a MEC service (e.g., MEC service 371), perform traffic control (e.g., using traffic control 373), or perform DNS handling (using DNS handling 375). According to an example embodiment of the disclosure, the MEC service may collectively refer to services related to a procedure and information required to use the MEC applications.

According to various embodiments, the electronic device 100 may establish the data path 200-2 together with the first MEC edge host 301, and be connected to the Internet 900 to receive or transmit data from or to the remote server 400.

Figure 2:
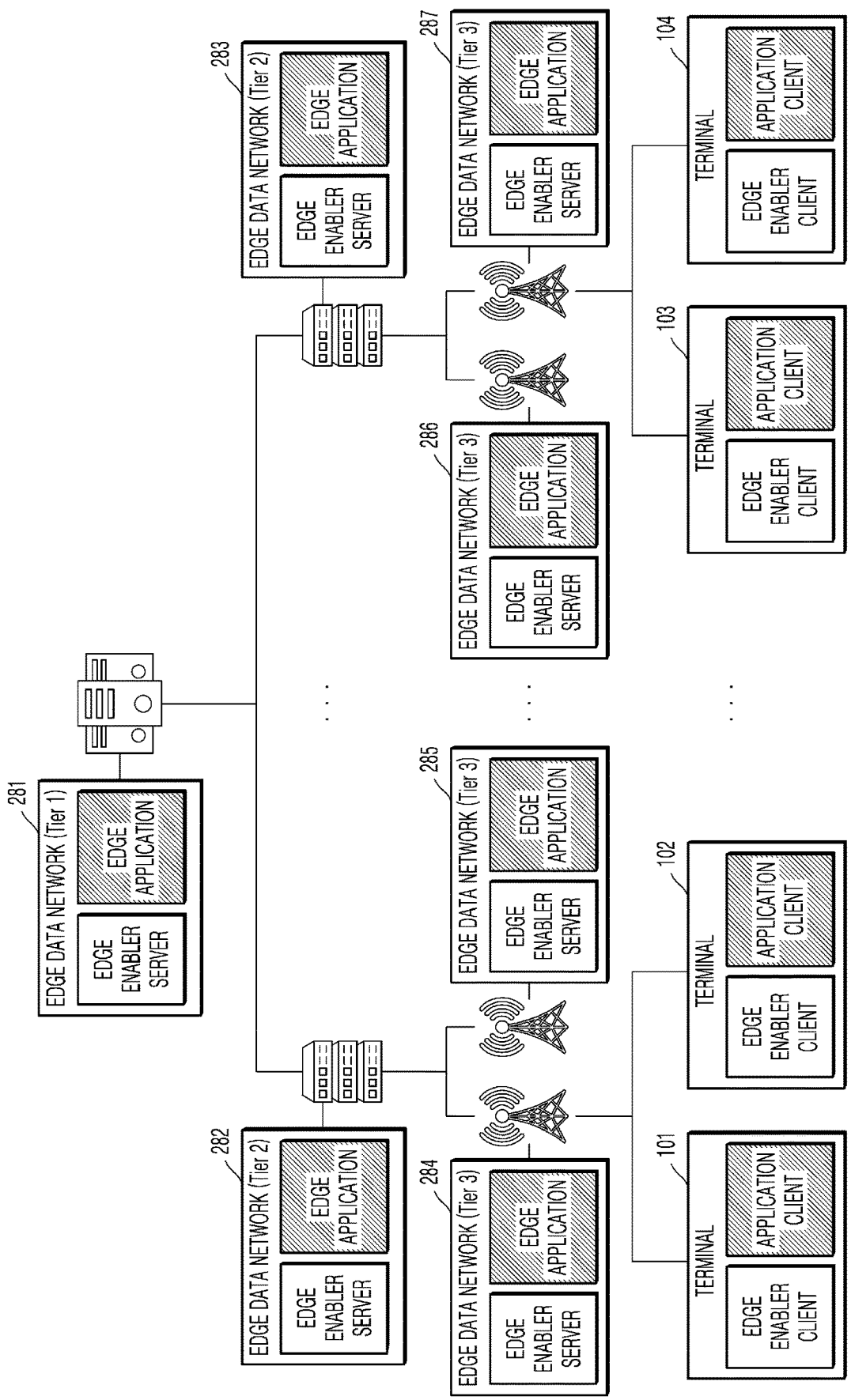
FIG. 2 is a diagram illustrating an example of a hierarchical structure of edge data networks in a network environment, according to various embodiments.

FIG. 2 is a diagram illustrating an example of a hierarchical structure 280 of edge data networks in a network environment, according to various embodiments.

Referring to FIG. 2, the hierarchical edge data network structure 280 may include a Tier-1 edge data network 281, Tier-2 edge data networks 282 and 283, Tier-3 edge data networks 284, 285, 286, and 287, and terminals 101, 102, 103, and 104. However, the configuration of the network structure 200 is not limited to the configuration shown in FIG. 2.

For example, the number of tiers may be increased in a vertical direction, or the number of lower-tier edge data networks may be increased in a horizontal direction. The number of lower-tier edge data networks connected to each edge data network may be determined based on characteristics of a certain area where the edge data network provides an edge computing service, characteristics of users in the area, or service request patterns of the user, and thus may vary.

According to various embodiments, the Tier-1 edge data network 281 may be located at a cloud unit or central unit (CU) of the whole network system, and the Tier-2 edge data networks 282 and 283 may be located at distributed units (DUs) or access units (AUs). The Tier-3 edge data networks 284, 285, 286, and 287 may be located at cell sites or radio units (RUs).

According to various embodiments, the Tier-1 edge data network 281 (e.g, corresponding to first MEC server 301 in FIG. 1B) may be located at a center cloud of a carrier network, and the Tier-2 edge data networks 282 (e.g., corresponding to second MEC server 302 in FIG. 1B) and 283 may be located at exchange stations or stations in major core areas of a national network. The Tier-3 edge data networks 284, 285, 286, and 287 may be located at cell sites or on-sites for providing a business-to-business (B2B) or business-to-business (B2B) service.

According to various embodiments, Tier-4 edge data networks (not shown) may be located at relay stations in buildings.

Figure 3:
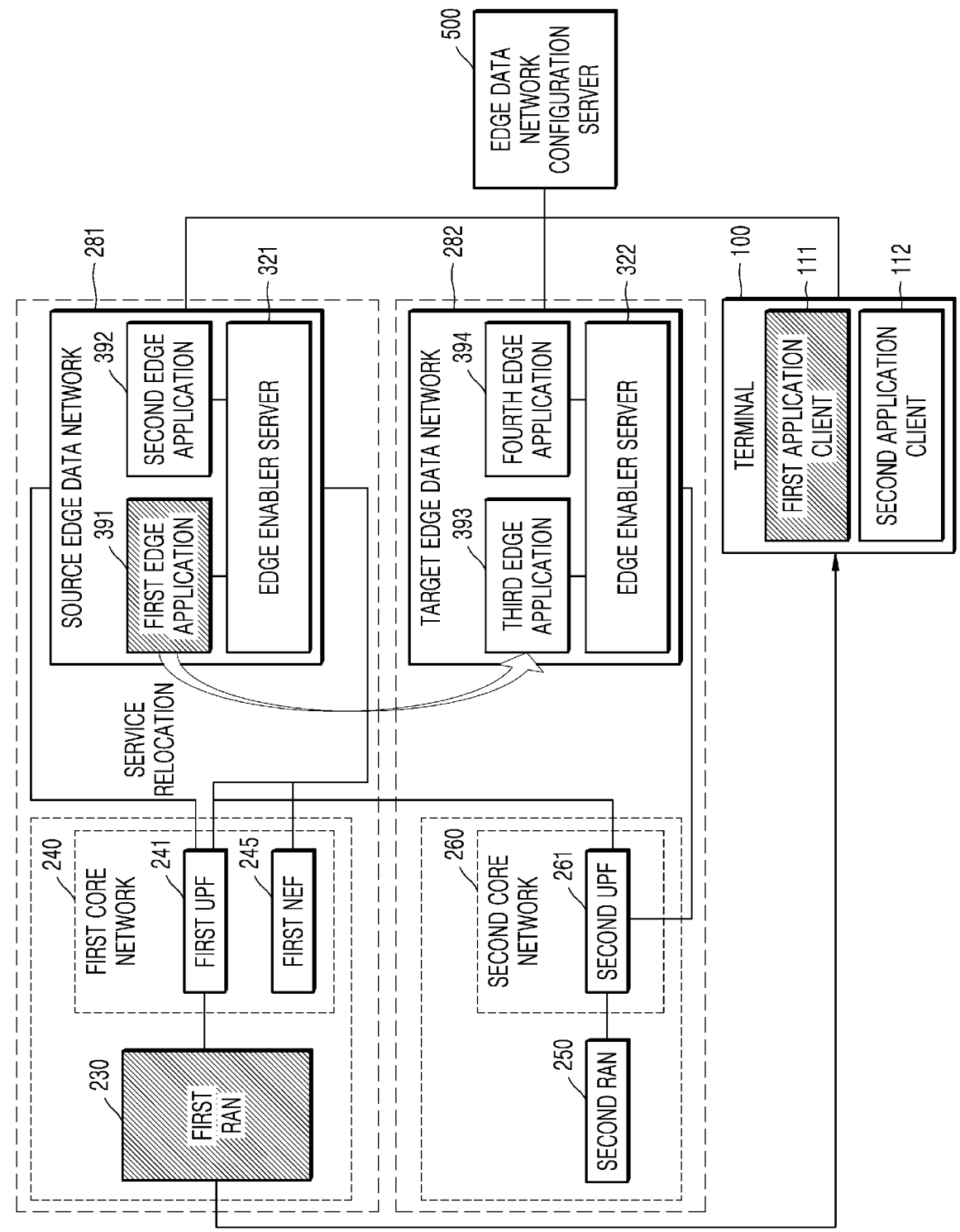
FIG. 3 is a diagram illustrating an example network environment for supporting an edge computing service in a case when the edge computing service is relocated, according to various embodiments.

FIG. 3 is a diagram illustrating an example network environment for supporting an edge computing service in a case when the edge computing service is relocated, according to various embodiments.

According to various embodiments, relocation of edge computing services may refer to changing services provided from a source edge data network 281 to a terminal 100, to be provided from a target edge data network 282 when a certain cause for relocation occurs. Specifically, relocation of edge computing services may refer, for example, to relocating an application context (or an application instance) for the terminal 100 from a first edge application 391 of the source edge data network 281 (i.e., a source edge application) to a third edge application 393 of the target edge data network 282 (i.e., a target edge application).

According to various embodiments, relocation of edge computing services may be a sort of service handover, and the source edge data network 281 may continuously provide the services to another terminal after the services are relocated to the target edge data network 282.

Referring to FIG. 3, the terminal 100 may execute (or run) a first application client 111 and a second application client 112. The terminal 100 may transmit or receive data related to the first application client 111 to or from the source edge data network 281 or the first edge application 391 through a first RAN 230 and a first UPF 241.

According to various embodiments, a first core network 240 is a core network connected to the first RAN 230 and the source edge data network 281. The first core network 240 may include the first UPF 241 and a first NEF 245, and further include other network entities.

According to various embodiments, the first UPF 241 may provide a data path (or a data plane) between the terminal 100 and the source edge data network 281. That is, the first UPF 241 may serve as a gateway for delivering data (or data packets) transmitted or received by the terminal 100. According to an example embodiment, the first NEF 245 may be connected to the source edge data network 281 to deliver an event or information, which has occurred from a network function (NF) in a 3GPP network, to the source edge data network 281, or deliver an event or information requested by the source edge data network 281, to the NF.

According to various embodiments, the source edge data network 281 is an edge data network connected to the terminal 100 to provide an edge computing service to the terminal 100.

According to various embodiments, the edge computing service provided from the source edge data network 281 may vary depending on the terminal 100 or an application client of the terminal 100. For example, the edge computing service provided from the source edge data network 281 may include at least one of a drone control service, an augmented reality (AR) content providing service, a virtual reality (VR) content providing service, a game content providing service, a broadcast content providing service, a massive media content providing service, an artificial intelligence (AI) computation (image object recognition or language recognition) service, or an autonomous driving information providing service.

According to various embodiments, the source edge data network 281 may execute a plurality of edge applications (e.g., the first edge application 391 and a second edge application 392), and include an edge enabler server 321. However, the configuration of the source edge data network 281 is not limited to the configuration illustrated in FIG. 3. Referring to FIG. 3, the first edge application 391 may establish a data session with the first application client 111 of the terminal 100. The first edge application 391 may provide the edge computing service or transmit data for providing the edge computing service to the first application client 111. In the disclosure, when the source edge data network 391 provides the edge computing service or transmits the data for providing the edge computing service to the terminal 100, it may refer, for example, to an edge application (e.g., the first edge application 391) of the source edge data network 281 providing the edge computing service or transmitting the data for providing the edge computing service to an application client (e.g., the first application client 111) of the terminal 100.

According to various embodiments, the source edge data network 281 may obtain location information of the terminal 100. For example, the source edge data network 281 may receive the location information of the terminal 100 from the terminal 100 or at least one of 3GPP network entities connected to the terminal 100. The location information of the terminal 100 may include not only information about a current location of the terminal 100 but also information about a base station communicating with the terminal 100 at the current location, information about an edge data network closest to the current location, information about changes in the location of the terminal 100, or information about a traveled path of the terminal 100.

According to various embodiments, the source edge data network 281 may transmit a message for requesting the location information of the terminal 100 to the terminal 100, and receive the location information of the terminal 100 from the terminal 100. The location information of the terminal 100 receivable from the terminal 100 may include location information of the terminal 100 obtained by the terminal 100 using a global positioning system (GPS). In this case, the location information of the terminal 100 may be transmitted from the terminal 100 to the source edge data network 281 through the first RAN 230 and the first UPF 241.

According to various embodiments, the source edge data network 281 may receive the location information of the terminal 100 from a 3GPP network entity connected to the terminal 100. For example, the source edge data network 281 may transmit a message for requesting to subscribe to a capability or service for reporting an event related to the location of the terminal 100 (e.g., a current location of the terminal 100, changes in the location of the terminal 100, or the location of the terminal 100 in a specific situation), which is exposed by the first NEF 245 of a 3GPP network connected to the terminal 100, and receive a message for reporting the event related to the location of the terminal 100 from the first NEF 245. The event related to the location of the terminal 100 may include an event related to the location of the terminal 100, which is detected by an AMF or a GMLC of the 3GPP network.

According to various embodiments, the message for reporting the event related to the location of the terminal 100 may include, as the location information of the terminal 100, GPS information of the terminal 100, information about an area where the terminal 100 is located, or information about a cell connected to the terminal 100.

According to various embodiments, the location information of the terminal 100 may be obtained using an edge computing service provided by the edge enabler server 321 of the source edge data network 281 (e.g., a location service for providing location information of the terminal 100).

According to various embodiments, the location information of the terminal 100 obtained by the source edge data network 281 may be a combination of the location information of the terminal 100 received from the first NEF 245 and the location information received from the terminal 100.

According to various embodiments, based on priorities of edge computing services currently provided from the source edge data network 281, and locations of terminals using each edge computing service, an edge data network configuration server 500 may relocate some of currently provided edge computing services to a target edge data network (not shown in FIG. 3) of a higher tier or the target edge data network 282 of a lower tier. Herein, the edge data network configuration server 500 may provide, to an edge data network or a terminal, edge data network configuration information for using an edge computing service (e.g., information about an edge data network for providing the edge computing service in a certain area, or information for identifying the edge data network).

According to various embodiments, the target edge data network 282 is an edge data network for providing the service to the terminal 100 after the edge computing service is relocated. The target edge data network 282 may be electrically connected to a second RAN 250 to provide the service to the terminal 100. As described above, even after the target edge data network 282 starts to provide the service to the terminal 100, the source edge data network 281 may continuously provide the service to another terminal.

A method of determining whether to perform edge computing service relocation, a method of selecting an edge computing relocation target service from a source edge data network to a target edge data network, and a method of determining a target edge data network, and a method of relocating an edge computing service will be described in detail below.

According to various embodiments, the target edge data network 282 may execute a plurality of edge applications (e.g., the third edge application 393 and a fourth edge application 394), and include an edge enabler server 322. However, the configuration of the target edge data network 302 is not limited to the configuration illustrated in FIG. 3. Referring to FIG. 3, the edge applications of the target edge data network 282 may not have established data sessions with the application clients of the terminal 100.

According to various embodiments, a second core network 260 is a core network connected to the second RAN 250 and the target edge data network 282. The second core network 260 may include a second UPF 261, and further include other network entities. The second UPF 261 may provide a data path between the terminal 100 and the target edge data network 282 after handover is performed.

Figure 4:
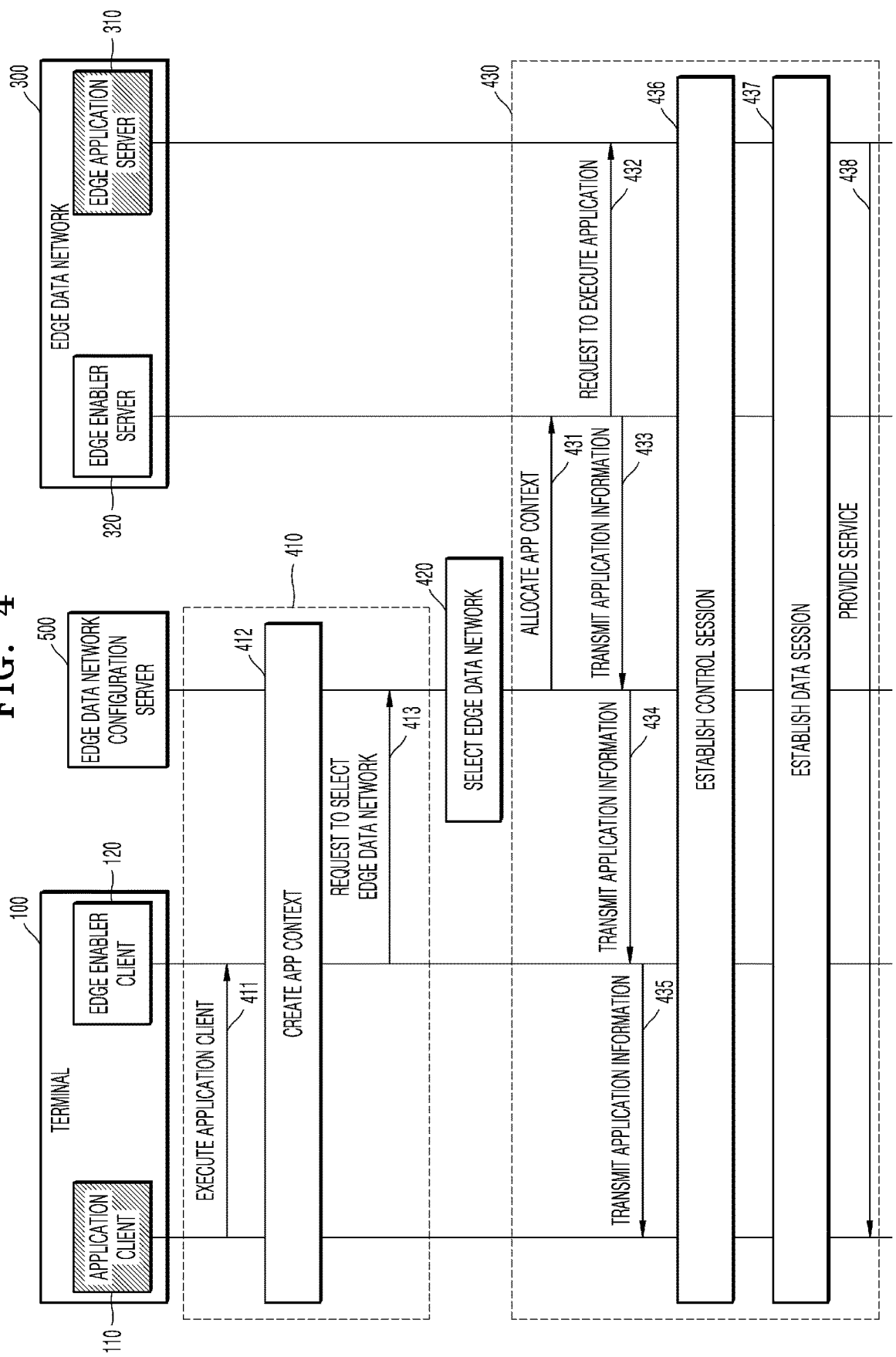
FIG. 4 is a flowchart illustrating an example method of providing a service from an edge data network to a terminal in a network system, according to various embodiments.

FIG. 4 is a flowchart illustrating an example method of providing an edge computing service from an edge data network to a terminal in a network system, according to various embodiments.

Referring to FIG. 4, the network system may include a terminal 100, an edge data network 300, and an edge data network configuration server 500.

According to various embodiments, the terminal 100 may include an application client 110 and an edge enabler client 120, and the edge data network 300 may include an edge application server 310 and an edge enabler server 320.

According to various embodiments, the edge data network configuration server 500 may refer to a MMP server or a DNS server.

An example method of providing an edge computing service from an edge data network to a terminal will now be described in detail with reference to FIG. 4.

The method of providing the edge computing service from the edge data network 300 to the terminal 100 may include requesting to provide an edge computing service (operation 410), selecting an edge data network 300 for providing the edge computing service (operation 420), and providing the edge computing service (operation 430).

The requesting to provide the edge computing service (operation 410) may include executing the application client 110 (operation 411), requesting to create an App context (operation 412), and transmitting an edge data network selection request (operation 413).

In operation 411, the terminal 100 may execute the application client 110. The application client 110 may refer to an application for allowing the terminal 100 to receive the edge computing service. For example, the application client 110 may refer to an application for providing at least one of a drone control service, an AR content providing service, a VR content providing service, a game content providing service, a broadcast content providing service, a massive media content providing service, an AI computation (image object recognition or language recognition) service, or an autonomous driving information providing service.

According to various embodiments, when the terminal 100 executes the application client 110, the application client 110 may transmit, to the edge enabler client 120, information indicating that the application client 110 is executed. Alternatively, the edge enabler client 120 may detect (not shown) execution of the application client 110.

In operation 412, the terminal 100 and the edge data network configuration server 500 may create an App context (or an application context).

Creation of the App context is a procedure for joining an available application or requesting to instantiate a new application. Creation of the App context is a part of an application instantiation procedure, and an edge system maintains and manages a lifetime of an application by creating a related App context.

According to various embodiments, the App context may include a unique identifier (ID) in the edge system and unique information of an application instance, e.g., an address (e.g., a uniform resource identifier (URI)) provided by a client outside the edge system to interact with the application.

According to various embodiments, the App context is information about the application client 110 available in the edge system, and may refer to a reference data set for an application instance used to identify an application instance, allow life cycle management, and cooperate with a device application. For example, the App context may include information about an application supporting MEC-based data transmission from among applications installed in the terminal 100, ID information of the application client 110, information related to mobility of the terminal 100, life cycle information of the applications, status information of the terminal 100, information obtained by sensors, or information about network performance. The edge enabler client 120 may transmit an App context creation request message to the edge data network configuration server 500, and the edge data network configuration server 500 may create an App context based on App context data received from the terminal 100.

According to various embodiments, the edge data network configuration server 500 may receive an edge application address information request message from the terminal 100. According to an example embodiment, the edge application address information request message may refer to a message by which the edge data network configuration server 500 requests the edge data network 300 to distribute an edge application corresponding to the application client 110, after the terminal 100 transmits the App context creation request message related to the application client 110 to the edge data network configuration server 500 (or an MMP). In an example embodiment, the above-described App context creation request message may correspond to the edge application address information request message.

According to various embodiments, the application client 110 or the edge enabler client 120 may also create an App context. In this case, the edge enabler client 120 may transmit the created App context to the edge data network configuration server 500.

In operation 413, the edge enabler client 120 may request the edge data network configuration server 500 to select an edge data network 300.

According to various embodiments, the edge enabler client 120 may transmit, to the edge data network configuration server 500, a message for requesting to select an edge data network 300 for providing the edge computing service to the application client 110.

In an example embodiment, the edge data network selection request message may include information about the terminal 100, information related to a network protocol preferred by the application client 110, or information related to a user of the terminal 100. The information about the terminal 100 may include information about a location of the terminal 100, service requirements/preferences of the terminal 100, or connectivity of the terminal 100.

Although not shown in FIG. 4, even when the edge data network selection request is not received from the terminal 100, when a network environment changes (e.g., when a new service starts to be provided, when a currently provided service is terminated, or when the terminal 100 moves) or when a certain period has passed after an edge data network 300 is selected, the edge data network configuration server 500 may select an edge data network 300.

In operation 420, the edge data network configuration server 500 selects an edge data network 300 for providing the edge computing service.

According to various embodiments, the edge data network configuration server 500 may select an optimal edge data network 300 based on the App context and a certain network criterion (or criteria) in response to the edge data network selection request received in operation 413.

The edge computing service is employed to solve latency, resource limitation, and security problems caused in centralized cloud computing, and is a technology for reducing latency and distributing usage of resources by placing a plurality of edge data networks close to terminals. In this case, when the plurality of edge data networks are placed in a hierarchical manner as shown in FIG. 2 rather than in a planar manner, the network system may operate more efficiently.

Referring to FIG. 2, when the Tier-3 edge data network 284 located physically closest to the terminal 101 provides an edge computing service to the terminal 101, latency for providing the edge computing service may be the lowest. However, in general, a server of a lower tier may have fewer computing resources (or lower computing power or fewer server resources). Therefore, it may be the best choice to provide a service requiring immediacy, e.g., an AR or VR service, from an edge data network of a lower tier.

On the other hand, when the Tier-1 edge data network 281 located physically farthest from the terminal 101 provides an edge computing service to the terminal 101, latency of the edge computing service may be the highest but sufficient computing resources may be ensured. Therefore, a service requiring sufficient computing resources, e.g., an AI learning model creation service, or a service requiring safety, e.g., an autonomous vehicle or drone control service, may be provided from an edge data network of a higher tier.

However, for the autonomous vehicle or drone control service, for example, latency may lead to fatal accidents and thus immediacy of a certain level or above also needs to be guaranteed. Therefore, it may not always be the best choice to provide services requiring safety from an edge data network of a higher tier.

A method of selecting an edge data network, according to various embodiments of the disclosure, will be described in detail below with reference to FIGS. 7A, 7B, 8, 9, 10, and 11.

Returning to FIG. 4, the providing of the edge computing service (operation 430) may include allocating the App context (operation 431), transmitting an application execution request (operation 432), transmitting application information (operations 433, 434, and 435), establishing a control session (operation 436), establishing a data session (operation 437), and providing the edge computing service (operation 438).

In operation 431, the edge data network configuration server 500 may allocate the App context.

The edge data network configuration server 500 may allocate the created App context or the App context received from the terminal 100, to the edge enabler server 320.

That is, the edge data network configuration server 500 may allocate the App context to the selected edge data network 300 to provide the edge computing service to the terminal 100.

Specifically, the edge data network configuration server 500 may transmit an App context allocation message including information related to the created App context, to the edge enabler server 320 such that the selected edge data network 300 may provide the edge computing service to the terminal 100 based on the information related to the App context.

In operation 432, the edge enabler server 320 may request the edge application server 310 to execute an edge application.

According to various embodiments, the edge application server 310 may refer to an application server in an edge hosting environment (e.g., application software functioning as a server in a cloud).

According to various embodiments, the edge application server 310 may execute an edge application corresponding to the application client 110, based on the App context for the application client 110, which is allocated from the edge data network configuration server 500.

In operations 433, 434, and 435, edge application information is transmitted from the edge enabler server 320 to the application client 110.

According to various embodiments, the edge application information may include address information of the edge application server 310 distributed to at least one edge data network 300. For example, the address information of the edge application server 310 may be designated in the form of an internet protocol (IP), a uniform resource locator (URL), or a fully qualified domain name (FQDN).

In operation 433, the edge enabler server 320 may transmit an application information message including the address information of the edge application server 310 to the edge data network configuration server 500.

In operation 434, the edge data network configuration server 500 may transmit the edge application information received from the edge enabler server 320, to the edge enabler client 120.

In operation 435, the edge enabler client 120 may transmit the edge application information received from the edge data network configuration server 500, to the application client 110.

In operation 436, the application client 110 may establish a control session using a transmission control protocol (TCP)/IP protocol. For example, the application client 110 may establish a control session with the edge application server 310 corresponding thereto, using the TCP/IP protocol.

In operation 437, the application client 110 may request a data socket for a data session, and the data socket may establish a data session according to given network protocol policies.

In operation 438, the application client 110 and the edge application server 310 may provide an edge application service. For example, the application client 110 may receive data from the edge application server 310 through the established data session. In addition, through the established data session, the application client 110 may transmit data to the edge application server 310.

Figure 5:
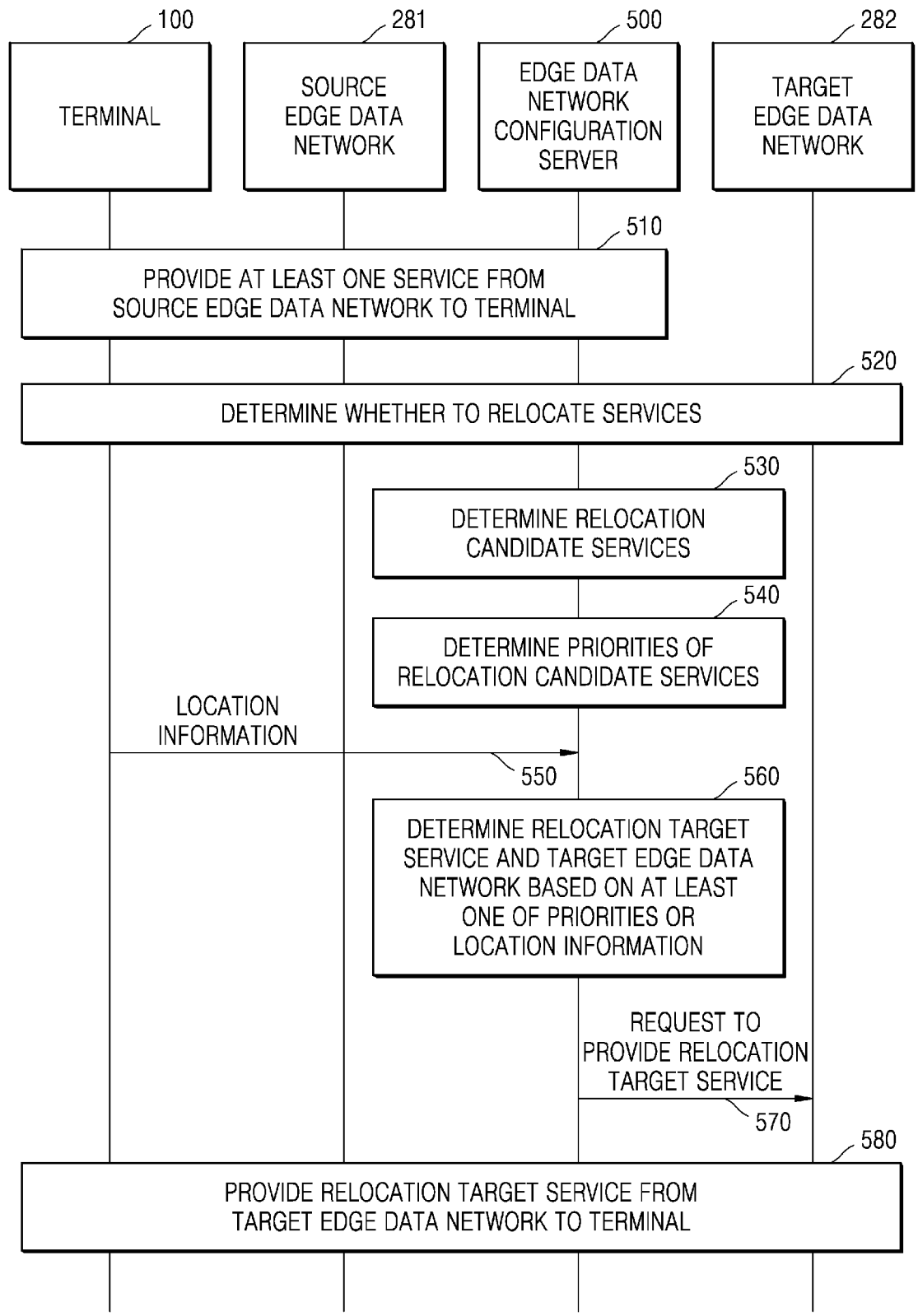
FIG. 5 is a flowchart illustrating an example method of relocating a service in a network system, according to various embodiments.

FIG. 5 is a flowchart illustrating an example method of relocating a service in a network system, according to various embodiments.

In the following description related to FIG. 5, descriptions provided above in relation to FIG. 4 will not be repeated.

Referring to FIG. 5, the network system may include a terminal 100, a source edge data network 281, a target edge data network 282, and an edge data network configuration server 500.

According to various embodiments, the terminal 100 may refer to a single entity or, in some cases, refer to multiple entities for receiving at least one service from a source edge data network. For example, the terminal 100 may refer to at least one terminal which is or was included in a service area of a source edge data network.

In operation 510, the source edge data network 281 may provide at least one service to the terminal 100.

According to various embodiments, the providing of the service in operation 510 may be performed through the procedure shown in FIG. 4, and may refer, for example, to a state in which the service is successfully provided from the source edge data network 281 to the terminal 100 by requesting to provide a service (operation 410), selecting an edge data network (operation 420), and providing the service (operation 430).

In operation 520, the edge data network configuration server 500, for example, may determine whether to relocate services.

According to various embodiments, relocation of services refers to changing services provided from the source edge data network 281 to the terminal 100, to being provided from the target edge data network 282, and the edge data network configuration server 500 may be configured to determine whether to relocate services, when a certain condition for relocation occurs.

According to various embodiments, whether to relocate services may be determined, for example, when the terminal 100 requests service relocation, when the source or target edge data network 281 or 282 requests service relocation, when the terminal 100 moves and thus handover occurs, when the terminal 100 requests that a new service be provided or requests to terminate a currently provided service, when a certain period of time has passed without any request after service deployment, or when a network environment changes.

According to various embodiments, the request to provide a new service may include, without limitation, a case when a terminal in a service area of a source edge data network requests a new service, or a case when a terminal using the service in another edge data network moves and enters a service area of a source edge data network.

According to various embodiments, the request to terminate the provided service may include, without limitation, a case when a terminal in a service area of a source edge data network terminates the provided service, or a case when a terminal using the service in a source edge data network moves and enters a service area of another edge data network.

According to various embodiments, whether to relocate services may be determined after a certain period of time has passed after previous service deployment. For example, the terminal 100 may periodically transmit a service relocation request.

Upon determining to relocate services in operation 520, in operation 530, the edge data network configuration server 500 may determine relocation candidate services.

According to various embodiments, the relocation candidate services may refer to, for example, a combination of services to be newly provided and services currently provided from the source edge data network to all terminals, except for services to be terminated from among the currently provided services. A method of determining relocation candidate services will be described in detail below.

In operation 540, the edge data network configuration server 500 may determine priorities of the relocation candidate services.

According to various embodiments, the priorities of the relocation candidate services may be determined based on latency and resource requirements of the relocation candidate services. A method of determining priorities of relocation candidate services will be described in detail below with reference to FIG. 8.

In operation 550, the edge data network configuration server 500 may obtain location information of the terminal 100.

According to various embodiments, the edge data network configuration server 500 may obtain the location information directly from the terminal 100, or receive (not shown) the location information of the terminal 100 from at least one of 3GPP network entities connected to the terminal 100.

According to various embodiments, the location information of the terminal 100 may include not only information about a current location of the terminal 100 but also information about a base station communicating with the terminal 100 at the current location, information about an edge data network closest to the current location, information about changes in the location of the terminal 100, or information about a traveled path of the terminal 100.

According to various embodiments, the edge data network configuration server 500 may transmit a message for requesting the location information of the terminal 100 to the terminal 100, and receive the location information of the terminal 100 from the terminal 100. The location information of the terminal 100 receivable from the terminal 100 may include location information of the terminal 100 obtained by the terminal 100 using GPS.

According to various embodiments, the edge data network configuration server 500 may receive the location information of the terminal 100 from a 3GPP network entity connected to the terminal 100. For example, the edge data network configuration server 500 may transmit a message for requesting to subscribe to a capability or service for reporting an event related to the location of the terminal 100 (e.g., a current location of the terminal 100, changes in the location of the terminal 100, or the location of the terminal 100 in a specific situation), which is exposed by an NEF of a 3GPP network connected to the terminal 100, and receive a message for reporting the event related to the location of the terminal 100 from the NEF. The event related to the location of the terminal 100 may include an event related to the location of the terminal 100, which is detected by an AMF or a GMLC of the 3GPP network.

According to various embodiments, the location information of the terminal 100 may be obtained using an edge computing service provided by an edge enabler server of the source edge data network 281 (e.g., a location service for providing location information of the terminal 100).

According to various embodiments, the location information of the terminal 100 obtained by the edge data network configuration server 500 may be the location information of the terminal 100 received from the 3GPP network entity. According to an example embodiment of the disclosure, the location information of the terminal 100 obtained by the edge data network configuration server 500 may be a combination of the location information of the terminal 100 received from the 3GPP network entity and the location information received from the terminal 100.

In operation 560, the edge data network configuration server 500 may determine a relocation target service and a target edge data network 282 based on at least one of the priorities of the relocation candidate services or the location information of the terminal 100.

A method of determining a relocation target service and a method of determining a target edge data network will be described in detail below with reference to FIGS. 7A, 7B, 8, 9, 10, and 11.

In operation 570, the edge data network configuration server 500 may request the target edge data network 282 to provide the relocation target service.

In operation 580, the target edge data network 282 may provide the relocation target service to the terminal 100.

According to various embodiments, the edge data network configuration server 500 may allocate an App context to the edge enabler server of the target edge data network 282, and the edge enabler server may transmit an application creation request to an edge application server of the target edge data network 282.

According to various embodiments, the source edge data network 281 may transmit the App context to the edge enabler server of the target edge data network 282.

The target edge data network 282 may transmit application information to the edge data network configuration server 500, and the edge data network configuration server 500 may transmit the application information to the terminal 100.

The terminal 100 and the target edge data network 282 may establish a control session and a data session based on the received application information. However, this procedure may be omitted when the control session or the data session is already established between the terminal 100 and the target edge data network 282.

The edge data network configuration server 500 may transmit, to the source edge data network 281, a message indicating that the service provided to the terminal 100 is terminated, and the source edge data network 281 may terminate the provided service. However, when the source edge data network 281 is currently providing the relocated target service to another terminal, the source edge data network 281 does not terminate an application client.

In this case, based on network configurations, the service provided from the source edge data network 281 to the terminal 100 may be terminated before the service starts to be provided from the target edge data network 282 to the terminal 100 (i.e., break-before-make), or the service provided from the source edge data network 281 to the terminal 100 may be terminated after the service starts to be provided from the target edge data network 282 to the terminal 100 (i.e., make-before-break).

In this case, the terminal 100 for receiving the relocated target service may include a terminal currently receiving the relocated target service, a terminal which has newly requested the relocated target service, and a terminal which enters the source edge data network 281 while receiving the relocated target service from another edge data network.

Figure 6:
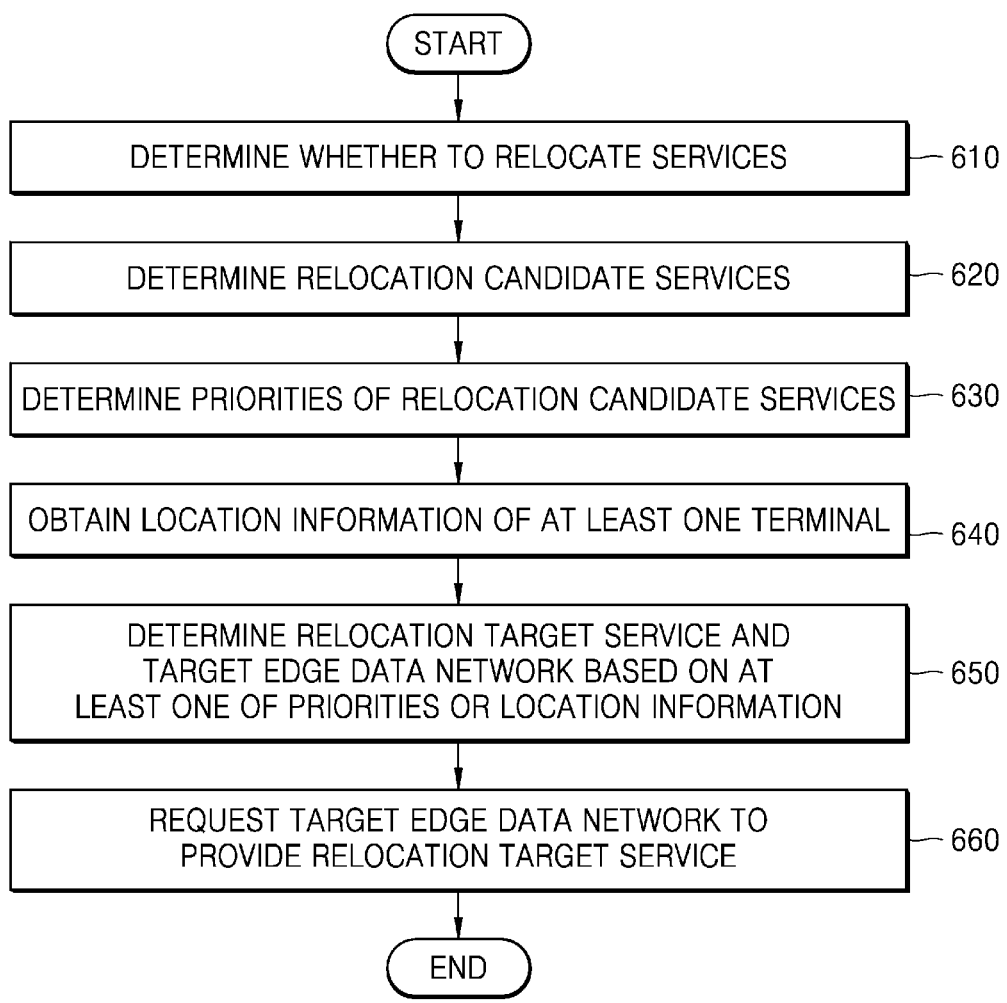
FIG. 6 is a flowchart illustrating an example method, performed by a server, of relocating a service, according to various embodiments.

FIG. 6 is a flowchart illustrating an example method, performed by a server, of relocating a service, according to various embodiments.

In the following description related to FIG. 6, descriptions provided above in relation to FIG. 5 will not be repeated.

In operation 610, an edge data network configuration server may determine whether to relocate services.

According to various embodiments, as described above, whether to relocate services may be determined, without limitation, when a terminal requests service relocation, when an edge data network requests service relocation, when the terminal moves and thus handover occurs, when the terminal requests to provide a new service or requests to terminate a currently provided service, when a certain period of time has passed without any request after service deployment, or when a network environment changes.

In operation 620, the edge data network configuration server may determine relocation candidate services by reflecting whether to relocate services.

According to various embodiments, the relocation candidate services may refer to a combination of services to be newly provided and services currently provided from a source edge data network to all terminals, except for services to be terminated from among the currently provided services. In operation 630, the edge data network configuration server determines priorities of the relocation candidate services.

According to various embodiments, the priorities of the relocation candidate services may be determined based on latency and resource requirements of the relocation candidate services. A method of determining priorities of relocation candidate services will be described in detail below with reference to FIG. 8.

In operation 640, the edge data network configuration server may obtain location information of the terminal.

According to various embodiments, the edge data network configuration server may receive the location information of the terminal directly from the terminal or from at least one of 3GPP network entities connected to the terminal.

According to various embodiments, the location information of the terminal may include not only information about a current location of the terminal but also, for example, information about a base station communicating with the terminal at the current location, information about an edge data network closest to the current location, information about changes in the location of the terminal, or information about a traveled path of the terminal.

In operation 650, the edge data network configuration server may determine a relocation target service and a target edge data network based on at least one of the priorities or the location information.

A method of determining a relocation target service and a method of determining a target edge data network will be described in detail below with reference to FIGS. 7A, 7B, 8, 9, 10, and 11.

In operation 660, the edge data network configuration server may request the target edge data network to provide the relocation target service.

Figure 7A:
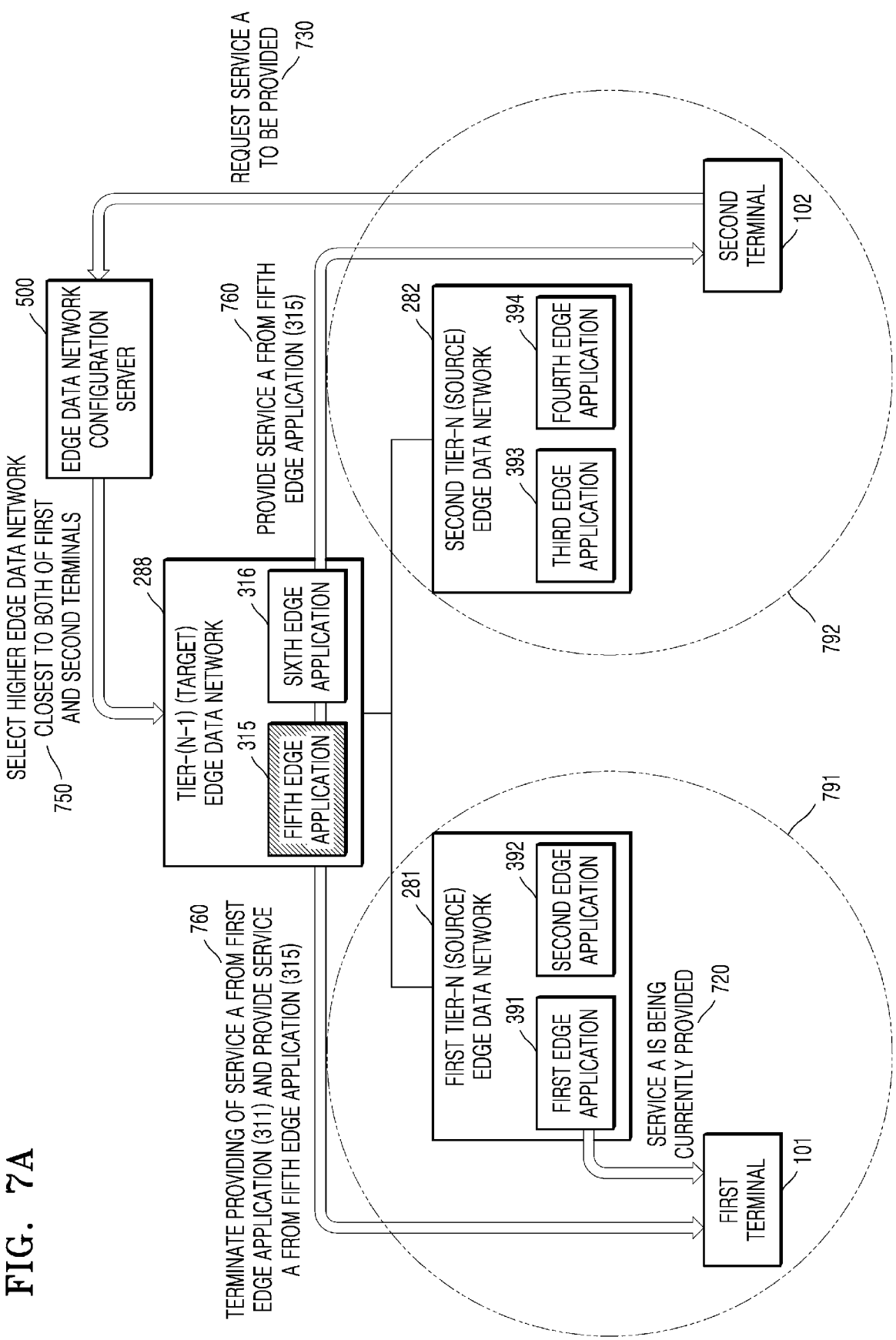
FIG. 7A is a diagram illustrating an example method of relocating a service based on locations of terminals in a network system, according to various embodiments.

FIG. 7A is a diagram illustrating an example method of relocating a service based on locations of terminals in a network system, according to various embodiments.

Referring to FIG. 7A, the network system may include a first terminal 101, a second terminal 102, a first Tier-N edge data network 281, a second Tier-N edge data network 282, a Tier-(N−1) edge data network 288, and an edge data network configuration server 500. In this case, it is assumed that the first terminal 101 is located in a service area 791 of the first Tier-N edge data network 281 and the second terminal 102 is located in a service area 792 of the second Tier-N edge data network 282.

It is also assumed that, while the first terminal 101 located in the service area 791 of the first Tier-N edge data network 281 is currently receiving (see reference numeral 720) a service A from the first Tier-N edge data network 281, the second terminal 102 located in the service area 792 of the second Tier-N edge data network 282 requests (see reference numeral 730) the service A to be provided.

Because the second terminal 102 is located in the service area 792 of the second Tier-N edge data network 282, the lowest latency may be guaranteed when the second Tier-N edge data network 282 provides the service A to the second terminal 102. However, when all edge applications of the second Tier-N edge data network 282 are in use and thus the second Tier-N edge data network 282 may not provide the new service A, or when a large number of terminals are receiving the service A from the second Tier-N edge data network 282 and thus idle resources are insufficient to provide the service A to a new terminal, the second terminal 102 may not receive the service A from the second Tier-N edge data network 282. In this case, in order to provide the service A to the second terminal 102, the edge data network configuration server 500 needs to relocate services to provide the service A from an edge data network other than the second Tier-N edge data network 282.

Alternatively, even when the second Tier-N edge data network 282 may provide the new service A, service deployment may be performed to provide the service A from an edge data network capable of mostly efficiently operating server resources.

The edge data network configuration server 500 having received, from the second terminal 102, a request to provide the service A may check locations of the first and second terminals 101 and 102. When the result of checking the locations of the first and second terminals 101 and 102 indicates that the two terminals are located in service areas of different edge data networks, a higher-tier edge data network closest to both of the first and second terminals 101 and 102, e.g., the Tier-(N−1) edge data network 288, may be selected (see reference numeral 750) as a target edge data network for providing the service A.

When the Tier-(N−1) edge data network 288 is selected as the target edge data network, the edge data network configuration server 500 may allocate an App context and transmit (not shown) an application creation and distribution message to the target edge data network. A service providing procedure is described above in relation to FIG. 4 and thus a detailed description thereof will not be provided herein.

When the target edge data network 288 starts to provide the service A, the first and second terminals 101 and 102 may receive (see reference numeral 760) the service A from the target edge data network 303.

In this case, resources of edge data networks may be more efficiently used. For example, when the first Tier-N edge data network 281 provides the service A to the first terminal 101 and the second Tier-N edge data network 282 provides the service A to the second terminal 102, total idle resources include a second edge application 392, a fourth edge application 394, a fifth edge application 395, and a sixth edge application 396.

On the other hand, when the Tier-(N−1) edge data network 288 provides the service A to the first and second terminals 101 and 102 through the fifth edge application 395, total idle resources include a first edge application 391, the second edge application 392, a third edge application 393, the fourth edge application 394, and the sixth edge application 396.

As such, not only the number of idle applications may be increased but also idle edge applications of a lower tier capable of guaranteeing a low latency preferred by service providers may be ensured. The edge data network configuration server 500 may utilize and operate the idle resources to provide other services.

According to various embodiments, even when the target edge data network provides the service A, providing of the service A from a source edge data network does not always need to be terminated. However, when the service A requires a low latency, the service requirement may not be satisfied due to relocation of the service A to a higher-tier edge data network. Therefore, to relocate a service to a higher-tier or lower-tier edge data network, a relocation target service may be determined based on service requirements.

For example, when another terminal is currently receiving the service A from the source edge data network, or when receiving of the service A from the source edge data network is preferable (e.g., when a terminal located in a service area of the source edge data network requires a low latency), the terminal may continuously receive the service A from the source edge data network of Tier N.

FIG. 7B is a flowchart illustrating an example method of relocating a service based on locations of terminals in a network system, according to various embodiments.

Referring to FIG. 7B, as in FIG. 7A, the network system may include the first terminal 101, the second terminal 102, the first Tier-N edge data network 281, the second Tier-N edge data network 282, the Tier-(N−1) edge data network 288, and the edge data network configuration server 500. It is assumed that the first terminal 101 is located in the service area 791 of the first Tier-N edge data network 281 and the second terminal 102 is located in the service area 792 of the second Tier-N edge data network 282.

To receive the service A, the first terminal 101 located in the service area 791 of the first Tier-N edge data network 281 requests (see reference numeral 710) the edge data network configuration server 500 the service A to be provided.

In this case, because the first terminal 101 is located in the service area 791 of the first Tier-N edge data network 281, the request of the first terminal 101 to provide the service A may be transmitted through the first Tier-N edge data network 281 to the edge data network configuration server

500. According to an example embodiment of the disclosure, the request of the first terminal 101 to provide the service A may be transmitted directly to the edge data network configuration server 500 without passing through the first Tier-N edge data network 281.

The edge data network configuration server 500 having received, from the first terminal 101, the request to provide the service A may determine the first Tier-N edge data network 281 as an edge data network for providing the service A to the first terminal 101, allocate an App context and transmit (not shown) an application creation and distribution message to the first Tier-N edge data network 281 to provide (see reference numeral 720) the service A from the first Tier-N edge data network 281 to the first terminal 101. A service providing procedure is described above in relation to FIG. 4 and thus a detailed description thereof will not be provided here.

While the first terminal 101 is currently receiving the service A from the first Tier-N edge data network 281, when the second terminal 102 located in the service area 792 of the second Tier-N edge data network 282 requests (see reference numeral 730) the service A to be provided, the edge data network configuration server 500 having received the request to provide the service A may check (see reference numeral 740) locations of the first and second terminals 101 and 102 to select an optimal edge data network for providing the service A to the first and second terminals 101 and 102.

According to various embodiments, when the result of checking the locations of the first and second terminals 101 and 102 indicates that the two terminals are located in service areas of different edge data networks, a higher-tier edge data network closest to both of the first and second terminals 101 and 102, e.g., the Tier-(N−1) edge data network 288, may be selected (see reference numeral 750) as a target edge data network for providing the service A.

However, a method of selecting an optimal edge data network for providing the service A to the first and second terminals 101 and 102 is not limited thereto.

When the target edge data network is selected (see reference numeral 750), the edge data network configuration server 500 allocates an App context to the Tier-(N−1) edge data network 288 to start providing services from the target edge data network 288, and transmits (not shown) an application creation and distribution message to the target edge data network 288 to provide the service A from the target edge data network 288 to the first and second terminals 101 and 102 (see operation 760).

Figure 8:
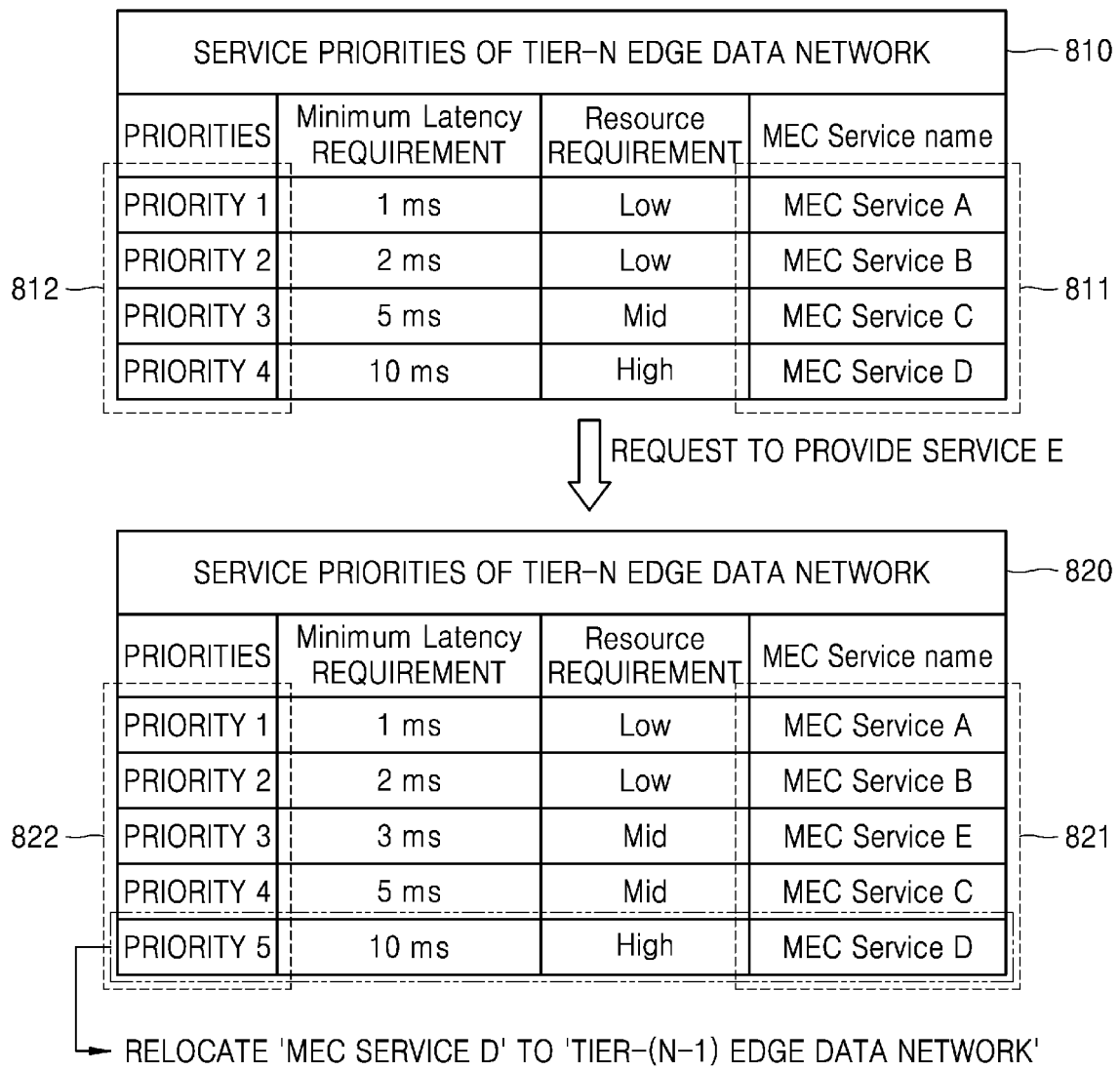
FIG. 8 is a diagram illustrating an example method of relocating a service based on priorities of services provided from an edge data network, according to various embodiments.

FIG. 8 is a diagram illustrating an example method of relocating a service based on priorities of services provided from an edge data network, according to various embodiments.

Referring to FIG. 8, priorities of services provided from an edge data network may be determined based on minimum latency requirements and resource requirements of the services.

According to various embodiments, a service requiring a lower latency or fewer resources may have a higher priority.

According to various embodiments, a higher-tier edge data network may have more resources, and a lower-tier edge data network may have fewer resources and thus may not easily provide a large number of services at the same time or provide a service requiring high computational performance.

According to various embodiments, in general, deployment of services to an edge data network capable of guaranteeing the lowest latency may be preferred on the assumption that the minimum resource requirement is satisfied, or deployment of services to an edge data network capable of providing the largest number of resources may be preferred on the assumption that the minimum latency requirement is satisfied.

Reference numeral 810 indicates a priority table of services A, B, C, and D currently provided from a Tier-N edge data network according to an example embodiment, based on minimum latency requirements and resource requirements thereof.

It is assumed that priorities 812 are determined in the order of MEC service A, MEC service B, MEC service C, and MEC service D of the MEC services 811 based on the minimum latency requirements and the resource requirements of the MEC services A, B, C, and D and that a new MEC service E is requested to be provided (or distributed) while the MEC services A, B, C, and D are being currently provided. The new MEC service E is a service having a minimum latency requirement of 3 ms and a middle resource requirement.

An edge data network configuration server determines relocation candidate services as the MEC services A, B, C, D, and E by adding the newly requested MEC service E to the currently provided MEC services A, B, C, and D.

When the MEC service C is requested (not shown) to be terminated, the edge data network configuration server may determine the relocation candidate services as the MEC services A, B, and D by excluding the MEC service C requested to be terminated from the currently provided MEC services A, B, C, and D.

When the relocation candidate services are determined, the edge data network configuration server may determine priorities between the relocation candidate services.

Reference numeral 820 indicates a priority table of the MEC services A, B, C, D, and E determined as the relocation candidate services of the Tier-N edge data network according to an example embodiment, based on minimum latency requirements and resource requirements thereof.

Priorities 822 may be determined in the order of MEC service A, MEC service B, MEC service E, MEC service C, and MEC service D of the MEC services 821 based on the minimum latency requirements and the resource requirements of the MEC services A, B, C, D, and E. According to an example embodiment, when the Tier-N (source) edge data network does not have sufficient resources to provide all relocation candidate services, the edge data network configuration server may select a relocation target service as the service D having the lowest priority from among the relocation candidate services, and determine a target edge data network as a Tier-(N−1) edge data network of a higher tier.

According to various embodiments, on the assumption that the minimum resource requirement is satisfied even when the first-priority service is relocated to a Tier-(N+1) edge data network of a lower tier, the edge data network configuration server may determine the relocation target service as the service A having the highest priority from among the relocation candidate services, and determine (not shown) the target edge data network as the Tier-(N+1) edge data network.

According to various embodiments, the edge data network configuration server may store priorities of all services in a memory, and update the priorities of the relocation candidate services upon determining later that service relocation is required. A case when determination of whether to relocate services is required and a case when service relocation is required are described above in relation to FIG. 5 and thus detailed descriptions thereof will not be provided here.

Figure 9:
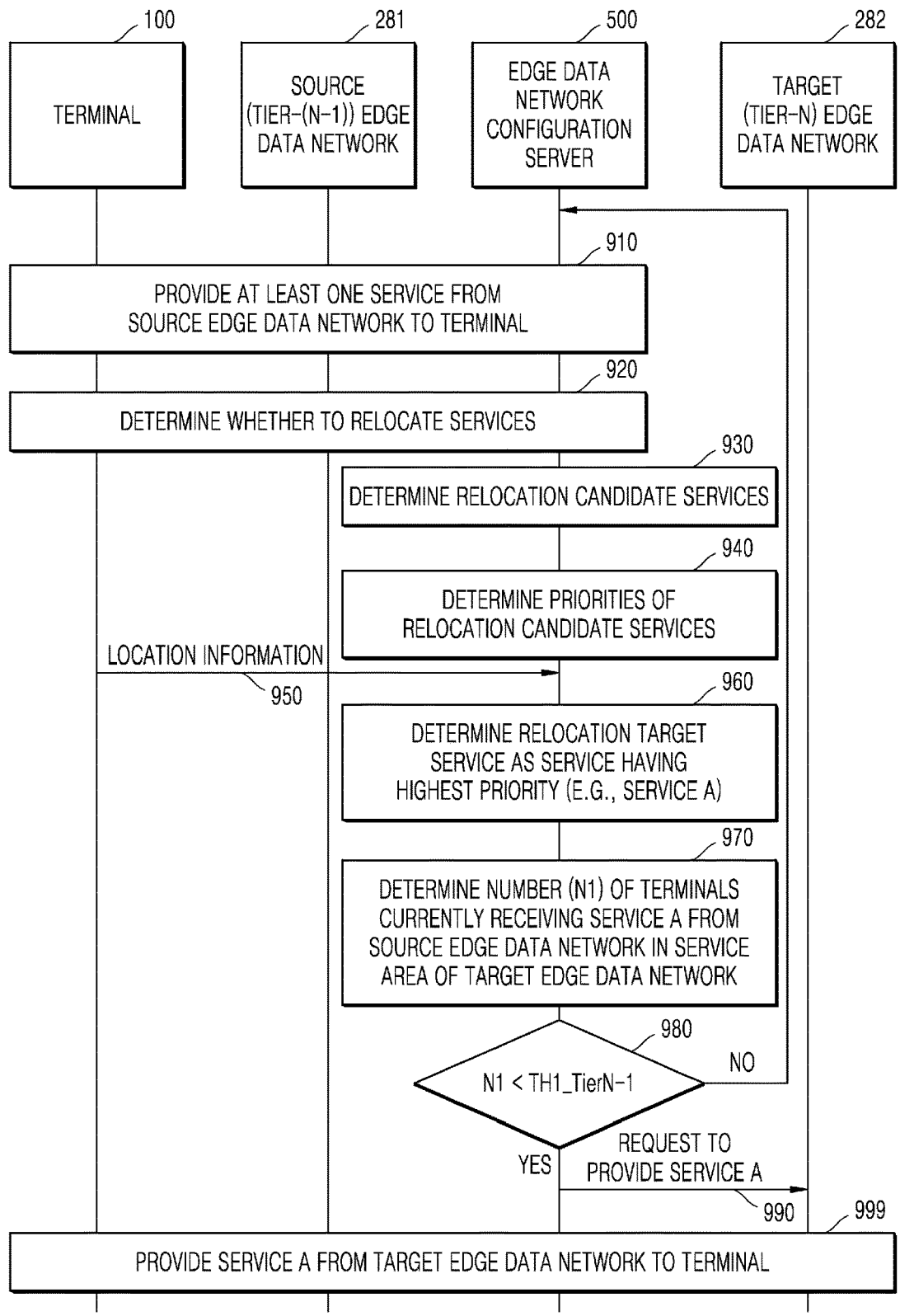
FIG. 9 is a flowchart illustrating an example method of relocating a service based on a location of a terminal and priorities of services in a network system, according to various embodiments.

FIG. 9 is a flowchart illustrating an example method of relocating a service based on a location of a terminal and priorities of services in a network system, according to various embodiments.

Referring to FIG. 9, the network system may include a terminal 100, a source edge data network 281 of Tier N−1, a target edge data network 282 of Tier N, and an edge data network configuration server 500, and the target edge data network 282 is located in a lower tier of the source edge data network 281.

In the following description related to FIG. 9, descriptions provided above in relation to FIG. 5 will not be repeated.

In operation 910, the source edge data network 281 may provide at least one service to the terminal 100. In this case, the at least one service provided from the source edge data network 281 to the terminal 100 may include a service A.

In operation 920, the edge data network configuration server 500 may determine whether to relocate services. Upon determining to relocate services in operation 920, in operation 930, the edge data network configuration server 500 may determine relocation candidate services.

In operation 940, the edge data network configuration server 500 may determine priorities of the relocation candidate services.

In operation 950, the edge data network configuration server 500 may obtain location information of the terminal 100. In this case, the location information of the terminal 100 may include not only information about a current location of the terminal 100 but also information about a base station communicating with the terminal 100 at the current location, information about an edge data network closest to the current location, information about changes in the location of the terminal 100, or information about a traveled path of the terminal 100.

In operation 960, the edge data network configuration server 500 may determine a relocation target service as a service having the highest priority (e.g., the service A) from among the relocation candidate services.

In operation 970, the edge data network configuration server 500 may determine the number N1 of terminals currently receiving the service A from the source edge data network 281 in a service area of the target edge data network 282 which is a lower-tier edge data network. As described above, the target edge data network 282 of Tier N is a lower-tier edge data network of the source edge data network 281 of Tier N−1.

According to various embodiments, the source edge data network 281 may include one or more lower-tier edge data networks, and the target edge data network 282 may refer to one of the one or more lower-tier edge data networks.

In operation 980, the edge data network configuration server 500 may compare the number N1 of terminals currently receiving the service A from the source edge data network 281 in the service area of the target edge data network 282, to a certain threshold TH1_Tier N−1. According to an example embodiment, the certain threshold TH1_Tier N−1 may indicate the largest number of terminals to which the target edge data network 282 is capable of providing the service A.

When the comparison result indicates that N1 is not less than TH1_Tier N−1, the edge data network configuration server 500 may determine that the target edge data network 302 does not have sufficient resources to provide the service A, and allow the source edge data network 281 to continuously provide the service A to the terminal 100.

However, when the comparison result indicates that N1 is less than TH1_Tier N−1, the edge data network configuration server 500 may determine that the lower-tier edge data network has sufficient resources to provide the service A, and determine the lower-tier edge data network 282 as the target edge data network 282 for providing the service A, i.e., the relocation target service.

In operation 990, the edge data network configuration server 500 requests the target edge data network 282 to provide the service A.

In operation 999, the target edge data network 282 may provide the service A to the terminal 100.

Figure 10:
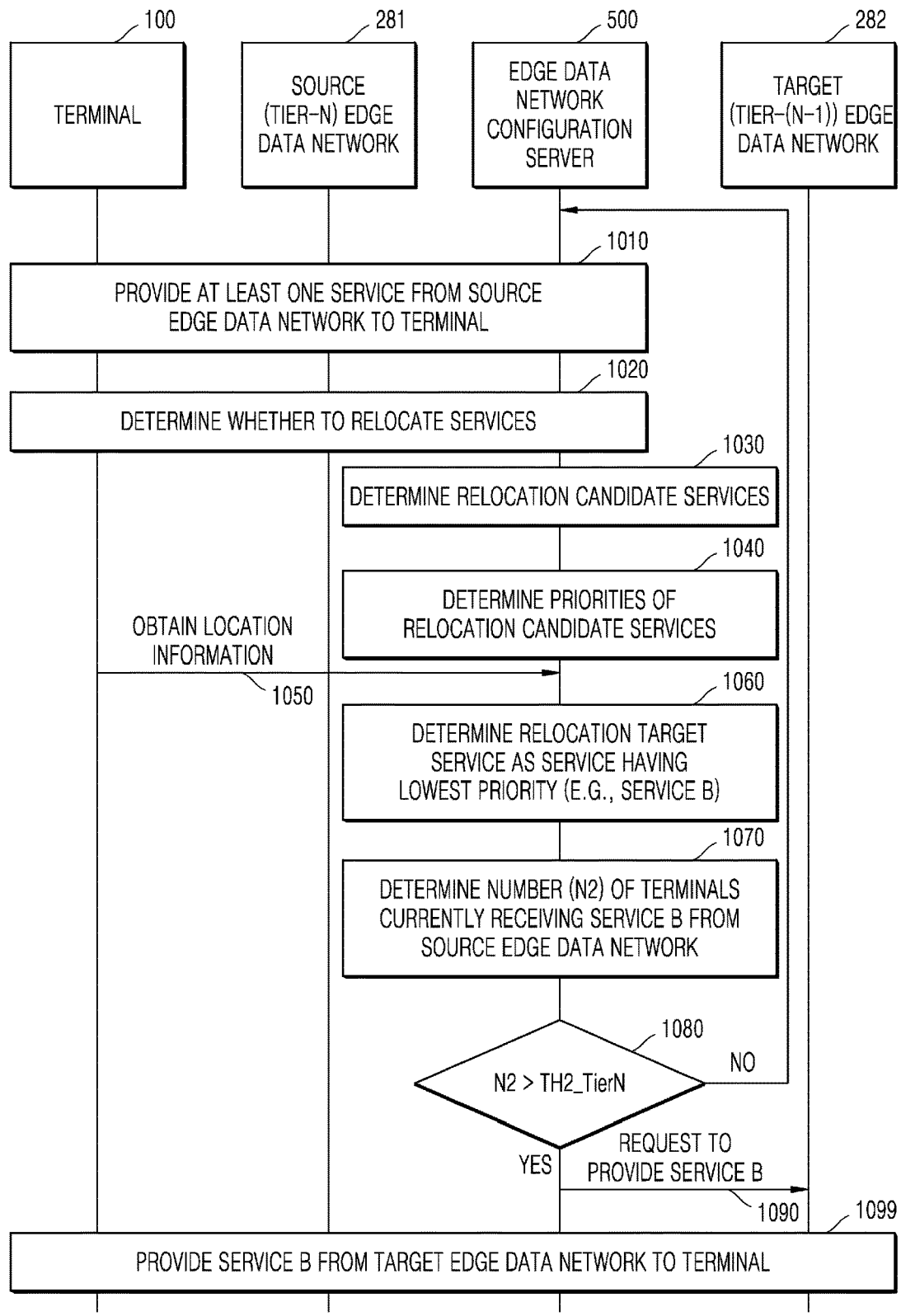
FIG. 10 is a flowchart illustrating an example method of relocating a service based on a location of a terminal and priorities of services in a network system, according to various embodiments.

FIG. 10 is a flowchart illustrating an example method of relocating a service based on a location of a terminal and priorities of services in a network system, according to various embodiments.

Referring to FIG. 10, the network system may include a terminal 100, a source edge data network 281 of Tier N, a target edge data network 282 of Tier N−1, and an edge data network configuration server 500, and the target edge data network 282 is located in a higher tier of the source edge data network 281.

In the following description related to FIG. 10, descriptions provided above in relation to FIGS. 5, 6, 7, 8, and 9 will not be repeated.

In operation 1010, the source edge data network 281 may provide at least one service to the terminal 100. In this case, the at least one service provided from the source edge data network 281 to the terminal 100 may include a service B.

In operation 1020, the edge data network configuration server 500 may determine whether to relocate services.

Upon determining to relocate services in operation 1020, in operation 1030, the edge data network configuration server 500 may determine relocation candidate services.

In operation 1040, the edge data network configuration server 500 may determine priorities of the relocation candidate services.

In operation 1050, the edge data network configuration server 500 may obtain location information of the terminal 100.

In operation 1060, the edge data network configuration server 500 may determine a relocation target service as a service having the lowest priority (e.g., the service B) from among the relocation candidate services.

In operation 1070, the edge data network configuration server 500 may determine the number N2 of terminals currently receiving the service B from the source edge data network 281.

In operation 1080, the edge data network configuration server 500 may compare the number N2 of terminals currently receiving the service B from the source edge data network 281, to a certain threshold TH2_Tier N. According to an example embodiment, the certain threshold TH2_Tier N may indicate the largest number of terminals to which the source edge data network 281 is capable of providing the service B.

When the comparison result indicates that N2 is not greater than TH2_Tier N, the edge data network configuration server 500 may determine that the source edge data network 281 has sufficient resources to provide the service B, and allow the source edge data network 281 to continuously provide the service B to the terminal 100.

However, when the comparison result indicates that N2 is greater than TH2_Tier N, the edge data network configuration server 500 may determine that the source edge data network 281 does not have sufficient resources to provide the service B, and determine the higher-tier edge data network as the target edge data network 282 for providing the service B, i.e., the relocation target service.

In operation 1090, the edge data network configuration server 500 requests the target edge data network 282 to provide the service B.

In operation 1099, the target edge data network 282 may provide the service B to the terminal 100.

Figure 11:
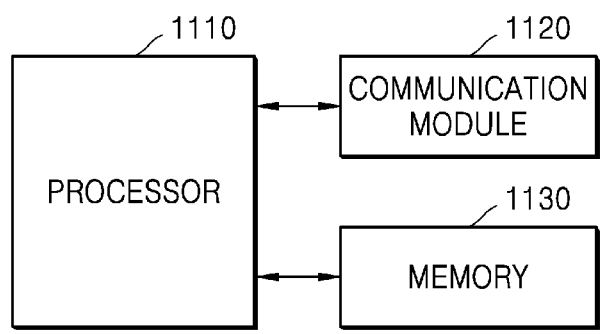
FIG. 11 is a block diagram illustrating an example configuration of an edge data network configuration server according to various embodiments.

FIG. 11 is a block diagram illustrating an example configuration of an edge data network configuration server according to various embodiments.

As illustrated in FIG. 11, the edge data network configuration server according to various embodiments may include a processor 1110, a communication module (including communication circuitry) 1120, and a memory 1130.

However, the elements of the edge data network configuration server are not limited to the configuration illustrated in FIG. 11. For example, the edge data network configuration server may include a larger or smaller number of elements compared to the above-mentioned elements. In addition, the processor 1110, the communication module 1120, and the memory 1130 may be implemented in the form of a single chip.

According to various embodiments, the processor 1110 may control a series of procedures performable by the edge data network configuration server according to the aforedescribed example embodiments. For example, the processor 1110 may control the other elements of the edge data network configuration server according to various embodiments in such a manner that the edge data network configuration server provides services to terminals.

Specifically, the processor 1110 may control the other elements of the edge data network configuration server in such a manner that the edge data network configuration server provides edge computing services to the terminals without latencies or errors due to service relocation. The processor 1110 may include a plurality of processors, and may execute a plurality of instructions (or programs) stored in the memory 1130 to relocate the services provided to the terminals as described above.

According to various embodiments, the processor 1110 may control a series of procedures performable by the edge data network configuration server 500 illustrated in FIGS. 1 to 11. For example, the edge data network configuration server 500 may be implemented as a plurality of instructions (or programs). The processor 1110 may perform operations of the edge data network configuration server 500 by executing the plurality of instructions (or programs).

According to various embodiments, the processor 1110 may determine, for example, whether to relocate services of a source edge data network, determine relocation candidate services based on the result of determining whether to relocate services, determine priorities of the relocation candidate services, obtain location information of a terminal, determine a relocation target service and a target edge data network based on at least one of the priorities or the location information, and request the target edge data network to provide the relocation target service to at least one terminal.

In this case, the source edge data network and the target edge data network may be hierarchically included in different tiers.

According to various embodiments, the relocation candidate services may refer to a combination of services to be newly provided and services currently provided from the source edge data network to all terminals in a service area, except for services to be terminated from among the currently provided services.

According to various embodiments, whether to relocate services may be determined, for example, when a terminal requests service relocation, when an edge data network requests service relocation, when the terminal moves and thus handover occurs, when the terminal requests to provide a new service or requests to terminate a currently provided service, when a certain period of time has passed without any request after service deployment, or when a network environment changes.

According to various embodiments, the processor 1110 may determine, for example, the relocation target service as a service having the highest priority, determine the number of terminals currently receiving the relocation target service from the source edge data network in a service area of a lower-tier edge data network of the source edge data network, compare the determined number of terminals to a certain threshold, and determine the lower-tier edge data network as the target edge data network when the comparison result indicates that the determined number of terminals is greater than the certain threshold. In this case, the certain threshold may indicate the largest number of terminals to which the lower-tier edge data network is capable of providing the relocation target service.

According to various embodiments, the processor 1110 may, for example, determine the relocation target service as a service having the lowest priority based on the result of determining the priorities, determine the number of terminals to which the source edge data network provides the relocation target service, compare the determined number of terminals to a certain threshold, and determine a higher-tier edge data network of the source edge data network as the target edge data network when the comparison result indicates that the number of terminals is less than the certain threshold. In this case, the certain threshold may indicate the largest number of terminals to which the source edge data network is capable of providing the relocation target service.

According to various embodiments, the processor 1110 may, for example, determine the target edge data network as a higher-tier edge data network of the source edge data network when the relocation target service has the highest priority from among the relocation candidate services, or determine the target edge data network as a lower-tier edge data network of the source edge data network when the relocation target service has the lowest priority from among the relocation candidate services.

According to various embodiments, the processor 1110 may identify services currently provided from the source edge data network and, in this case, the relocation candidate services may include a combination of services to be newly provided and the identified services, except for services to be terminated from among the identified services.

According to various embodiments, the priorities may be determined based on resource requirements and latency requirements of the relocation candidate services.

According to various embodiments, the processor 1110 may receive the location information of the terminal from at least one of the terminal or a 3GPP network entity connected to the terminal.

The communication module (including communication circuitry) 1120 may transmit or receive signals to or from an external device (e.g., the terminal 100), a network (e.g., a 3GPP network), a server (e.g., the service server 400), or another edge data network. The signals transmitted or received by the communication module 1120 may include control information and data. The communication module 1120 may include, for example, a radio-frequency (RF) transmitter for up-converting a frequency of and amplifying a signal to be transmitted, and a RF receiver for low-noise-amplifying and down-converting a frequency of a received signal. However, the RF transmitter and the RF receiver are merely examples and the elements of the communication module 1120 are not limited thereto. The communication module 1120 may receive signals through radio channels and output the signals to the processor 1110, and transmit signals output from the processor 1110, through radio channels.

According to various embodiments, the communication module 1120 may transmit or receive data to or from the terminal 100, the 3GPP network, or the edge data network under the control of the processor 1110. For example, the communication module 1120 may request and receive the location information of the terminal 100 from the terminal 100 or the 3GPP network.

According to various embodiments, the memory 1130 may store a plurality of instructions (or programs) and data required to operate the edge data network configuration server. The memory 1130 may store the control information or data included in the signals transmitted or received by the edge data network configuration server. The memory 1130 may include one or a combination of storage media such as a read-only memory (ROM), random access memory (RAM), a hard disk, a compact disc read only memory (CD-ROM), and a digital versatile disc (DVD). The memory 1130 may include a plurality of memories. According to an example embodiment, the memory 1130 may store a plurality of instructions (or programs) to be executed to allow the edge data network configuration server according to the afore-described example embodiments to relocate services provided to the terminal 100.

According to various embodiments, the memory 1130 may store data received from the terminal or the edge data network, and store the location information of the terminal and the service priority data.

The methods according to the various example embodiments as described in the claims and the specification may be implemented in the form of hardware, software, or a combination of both.

When implemented as software, a computer-readable storage medium or computer program product storing one or more programs (e.g., software modules) may be provided. The one or more programs stored in the computer-readable storage medium or computer program product are configured for execution by one or more processors in an electronic device. The one or more programs include instructions directing the electronic device to execute the methods according to the various example embodiments as described in the claims and the specification.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as an internet, an intranet, a local area network (LAN), a wide LAN (WLAN), and a storage area network (SAN). Such a storage device may access, through an external port, a device for implementing the various example embodiments. An additional storage device on the communication network may also access the device for implementing the various example embodiments.

In the disclosure, the term "computer program product" or "computer-readable medium" may, for example be used to collectively refer to media such as a memory, a hard disk installed in a hard disk drive, and signals. The "computer program product" or "computer-readable medium" may refer to a means to be provided to a software computer system including instructions for setting the length of a timer for receiving missing data packets, based on a network metric corresponding to a determined event according to the disclosure.

The disclosure provides an apparatus and method capable of effectively providing MEC-based services.

In the afore-described various example embodiments, each element included in the disclosure is expressed in a singular or plural form depending on the described example embodiments. However, the singular or plural form is selected properly for a situation assumed for convenience of description and does not limit the disclosure, and elements expressed in a plural form may include a single element and an element expressed in a singular form may include a plurality of elements.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the following claims and equivalents thereof.

What is claimed is:

1. A method, performed by an edge data network configuration server, of relocating at least one service, currently provided from a source edge data network to at least one terminal, to at least one of a plurality of edge data networks having a hierarchical structure, the method comprising:
   determining whether to relocate a service of the source edge data network;
   determining relocation candidate services, based on a result of determining whether to relocate the service;
   determining priorities of the relocation candidate services;
   obtaining location information of the at least one terminal;
   determining a relocation target service from among the relocation candidate services and a target edge data network, based on at least one of the priorities or the location information; and
   requesting the target edge data network to provide the relocation target service to the at least one terminal,
   wherein the determining of the target edge data network comprises determining the target edge data network to be in a tier of the hierarchical structure different from a tier of the source edge data network when a condition related to a number of terminals currently receiving the relocation target service is satisfied.

2. The method of claim 1, wherein the determining of the relocation target service and the target edge data network comprises:
   determining the relocation target service as a service having a highest priority among the relocation candidate services, based on a result of determining the priorities;
   determining a number of terminals currently receiving the relocation target service from the source edge data network in a service area of a lower-tier edge data network than the source edge data network;
   comparing the determined number of terminals to a threshold; and determining the lower-tier edge data network as the target edge data network based on a result of the comparing indicating that the determined number of terminals is less than the threshold, wherein the threshold corresponds to a largest number of terminals to which the lower-tier edge data network is capable of providing the relocation target service.

3. The method of claim 1, wherein the determining of the relocation target service and the target edge data network comprises:

determining the relocation target service as a service having a lowest priority among the relocation candidate services, based on a result of determining the priorities;

determining a number of terminals to which the source edge data network provides the relocation target service;

comparing the determined number of terminals to a threshold; and determining a higher-tier edge data network than the source edge data network as the target edge data network based on a result of the comparing indicating that the determined number of terminals is greater than the threshold, wherein the threshold corresponds to a largest number of terminals to which the source edge data network is capable of providing the relocation target service.

4. The method of claim 1, wherein the target edge data network is in a lower-tier than the source edge data network based on the relocation target service having a highest priority from among the relocation candidate services, or is in a higher-tier than the source edge data network based on the relocation target service having a lowest priority from among the relocation candidate services.

5. The method of claim 1, wherein the determining of the relocation candidate services comprises identifying services currently provided from the source edge data network, and wherein the relocation candidate services comprise a combination of services to be newly provided and the identified services, except for services to be terminated from among the identified services.

6. The method of claim 1, wherein the priorities are determined based on resource requirements and latency requirements of the relocation candidate services.

7. The method of claim 1, wherein the obtaining of the location information of the at least one terminal comprises receiving the location information of the at least one terminal from at least one of the at least one terminal or a $3^{rd}$ Generation Partnership Project (3GPP) network entity connected to the at least one terminal.

8. An edge data network configuration server for relocating at least one service, currently provided from a source edge data network to at least one terminal, to at least one of a plurality of edge data networks having a hierarchical structure, the edge data network configuration server comprising:

a communication module comprising communication circuitry;

a memory storing a plurality of instructions; and at least one processor configured to execute the plurality of instructions to:

determine whether to relocate a service of the source edge data network;

determine relocation candidate services, based on a result of determining whether to relocate the service;

determine priorities of the relocation candidate services;

obtain location information of the at least one terminal;

determine a relocation target service from among the relocation candidate services and a target edge data network based on at least one of the priorities or the location information; and request the target edge data network to provide the relocation target service to the at least one terminal, wherein the processor is configured to execute the instructions to determine the target edge data network to be in a tier of the hierarchical structure different from a tier of the source edge data network when a condition related to a number of terminals currently receiving the relocation target service is satisfied.

9. The edge data network configuration server of claim 8, wherein the at least one processor is further configured to execute the plurality of instructions to:

determine the relocation target service as a service having a highest priority among the relocation candidate services, based on a result of determining the priorities;

determine a number of terminals currently receiving the relocation target service from the source edge data network in a service area of a lower-tier edge data network than the source edge data network;

compare the determined number of terminals to a threshold; and determine the lower-tier edge data network as the target edge data network based on a result of the comparing indicating that the determined number of terminals is less than the threshold, wherein the threshold corresponds to a largest number of terminals to which the lower-tier edge data network is capable of providing the relocation target service.

10. The edge data network configuration server of claim 8, wherein the at least one processor is further configured to execute the plurality of instructions to:

determine the relocation target service as a service having a lowest priority from among the relocation candidate services, based on a result of determining the priorities;

determine a number of terminals to which the source edge data network provides the relocation target service;

compare the determined number of terminals to a threshold; and determine a higher-tier edge data network than the source edge data network as the target edge data network based on a result of the comparing indicating that the determined number of terminals is greater than the threshold, wherein the threshold corresponds to a largest number of terminals to which the source edge data network is capable of providing the relocation target service.

11. The edge data network configuration server of claim 8, wherein the target edge data network is in a lower-tier than the source edge data network based on the relocation target service having a highest priority from among the relocation candidate services, or is in a higher-tier than the source edge data network based on the relocation target service having a lowest priority from among the relocation candidate services.

12. The edge data network configuration server of claim 11, wherein the at least one processor is further configured to execute the plurality of instructions to identify services currently provided from the source edge data network, and wherein the relocation candidate services comprise a combination of services to be newly provided and the identified services, except for services to be terminated from among the identified services.

13. The edge data network configuration server of claim 8, wherein the priorities are determined based on resource requirements and latency requirements of the relocation candidate services.

14. The edge data network configuration server of claim 8, wherein the at least one processor is further configured to execute the plurality of instructions to receive the location information of the at least one terminal from at least one of the at least one terminal or a 3$^{rd}$ Generation Partnership Project (3GPP) network entity connected to the at least one terminal.

15. A non-transitory computer-readable recording medium having recorded thereon a computer program comprising instructions which, when executed, cause at least one processor to control an edge data network configuration server to:

determine whether to relocate a service of a source edge data network;

determine relocation candidate services, based on a result of determining whether to relocate the service;

determine priorities of the relocation candidate services;

obtain location information of at least one terminal;

determine a relocation target service from among the relocation candidate services and a target edge data network based on at least one of the priorities or the location information; and request the target edge data network to provide the relocation target service to the at least one terminal, wherein the determining of the target edge data network comprises determining the target edge data network to be in a tier of a hierarchical structure of a plurality of edge data networks different from a tier of the source edge data network when a condition related to a number of terminals currently receiving the relocation target service is satisfied.

* * * * *